United States Patent
Kubo et al.

(10) Patent No.: US 7,957,252 B2
(45) Date of Patent: Jun. 7, 2011

(54) OPTICAL DISC AND METHOD FOR IMAGE FORMING THEREON

(75) Inventors: Hiroshi Kubo, Minato-ku (JP);
Michihiro Shibata, Odawara (JP);
Tatsuo Fushiki, Hamamatsu (JP); Seiya Yamada, Shimada (JP); Hisanori Itoga, Hamatsu (JP)

(73) Assignees: FUJIFILM Corporation, Tokyo (JP); YAMAHA Corporation, Shizuoka (JP)

( * ) Notice: Subject to any disclaimer, the term of this patent is extended or adjusted under 35 U.S.C. 154(b) by 290 days.

(21) Appl. No.: 11/990,775

(22) PCT Filed: Sep. 28, 2006

(86) PCT No.: PCT/JP2006/319908
§ 371 (c)(1),
(2), (4) Date: Feb. 21, 2008

(87) PCT Pub. No.: WO2007/037511
PCT Pub. Date: Apr. 5, 2007

(65) Prior Publication Data
US 2009/0129253 A1    May 21, 2009

(30) Foreign Application Priority Data
Sep. 30, 2005 (JP) ................... 2005-288847

(51) Int. Cl.
*G11B 3/70* (2006.01)
(52) U.S. Cl. ..................... 369/274; 369/275.3
(58) Field of Classification Search .............. 369/274, 369/275.4, 275.1, 275.2, 275.3, 275.5; 347/224, 347/225; 720/718; 428/64.1; 430/321, 320
See application file for complete search history.

(56) References Cited

U.S. PATENT DOCUMENTS

| | | | |
|---|---|---|---|
| 5,946,286 A * | 8/1999 | Bahns ................... | 369/275.3 |
| 7,082,094 B2 * | 7/2006 | Morishima et al. ...... | 369/116 |
| 7,268,794 B2 * | 9/2007 | Honda et al. ........... | 347/224 |
| 7,331,055 B2 * | 2/2008 | Onodera et al. ......... | 720/718 |
| 7,558,169 B2 * | 7/2009 | Morishima ............. | 369/44.35 |
| 7,643,401 B2 * | 1/2010 | Takahashi et al. ...... | 369/275.4 |
| 2003/0179674 A1 | 9/2003 | Anderson et al. | |

(Continued)

FOREIGN PATENT DOCUMENTS

EP        1274084 A        1/2003

(Continued)

OTHER PUBLICATIONS

The extended European search report dated Jun. 4, 2009.

*Primary Examiner* — Tan X Dinh
(74) *Attorney, Agent, or Firm* — Sheldon J. Moss; Chad M. Herring

(57) ABSTRACT

The present invention provides an optical disc on which a visible image can be formed by irradiation of laser light, which comprises a logo area on which visible information is indicated, a pre-pit signal area, and an image forming area on which a visible image can be formed by irradiation of laser light; and an image forming method of forming a visible image by irradiation of laser light on an optical disc, the method including detecting a pre-pit signal from a pre-pit signal area formed on the optical disc, and forming the visible image based on the result of the detection, wherein the optical disc is the optical disc of an aspect of the invention.

9 Claims, 14 Drawing Sheets

U.S. PATENT DOCUMENTS

| | | |
|---|---|---|
| 2005/0180304 A1* | 8/2005 | Onodera et al. ............ 369/275.3 |
| 2005/0265211 A1* | 12/2005 | Nakane et al. ............. 369/275.1 |
| 2007/0002721 A1 | 1/2007 | Yoshimura et al. |
| 2007/0019064 A1* | 1/2007 | Yamada et al. ............... 347/224 |
| 2008/0153037 A1* | 6/2008 | Shibata ......................... 430/290 |
| 2009/0135708 A1* | 5/2009 | Shibata et al. ............. 369/275.4 |
| 2009/0290459 A1* | 11/2009 | Yamada et al. .............. 369/47.5 |

FOREIGN PATENT DOCUMENTS

| | | | |
|---|---|---|---|
| EP | 1308938 A | | 5/2003 |
| EP | 1930893 A | | 6/2008 |
| JP | 2000-113516 A | | 4/2000 |
| JP | 2000113516 A | * | 4/2000 |
| JP | 2000-173096 A | | 6/2000 |
| JP | 2000173096 A | * | 6/2000 |
| JP | 2001-283464 A | | 10/2001 |
| JP | 2002-245680 A | | 8/2002 |
| JP | 2004-5848 A | | 1/2004 |
| JP | 2005-196917 A | | 7/2005 |
| JP | 2006-031791 A | | 2/2006 |
| WO | 2005/031727 A | | 4/2005 |

* cited by examiner

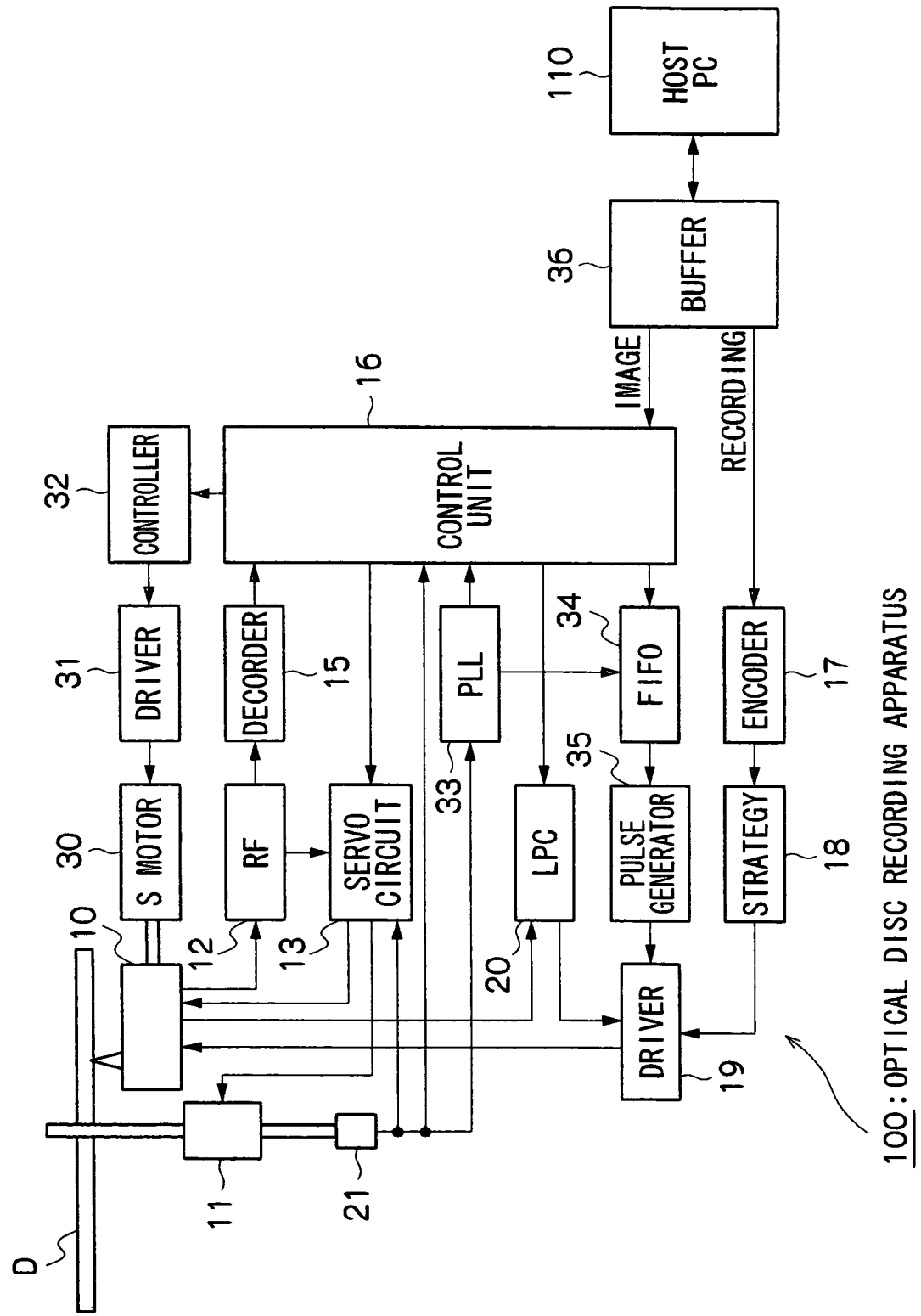

WHEN GRADATION LEVEL IS HIGH

WHEN GRADATION LEVEL IS LOW

INSERTION OF SERVO OFF-PULSE

INSERTION OF SERVO ON-PULSE

WHEN SPOT DIAMETER IS LARGE

WHEN SPOT DIAMETER IS SMALL

OPTICAL DISC AND METHOD FOR IMAGE FORMING THEREON

TECHNICAL FIELD

The present invention relates to an optical disc on which an image can be formed by laser light and a method of forming an image on optical discs.

BACKGROUND ART

As optical discs such as a write-once digital versatile disc (DVD-R), etc., optical discs having an ink receiving layer (printing layer) on their labeling side (a side opposite to the side on which laser light is irradiated during recording or reproduction of optical information) are in use in practice. Users can print pictures or drawings on the printing layer using an ink jet printer, etc.

Procedures for printing an image using an ink jet printer, etc. are advancing day by day, and image quality obtained has become exceptional. On the other hand, however, providing a new ink jet printer, etc., for forming an image is costly. Furthermore, transferring an optical disc to an ink jet printer, etc. to form an image thereon, after recording information on the optical discs, takes time and effort. The task seems to be more complicated where information is recorded on plural optical discs and images are formed therefrom. Furthermore, when a printing layer is provided on the surface of the optical disc, there is a fear that problems of storability, such as deterioration due to moisture in the air, stains due to adhesion of dusts, etc., may arise.

Image forming apparatuses and methods for forming an image that can record an image having a high contrast ratio on an optical disc as well as recording information on the recordable side have been suggested (for example, see Japanese Patent Application Laid-Open (JP-A) No. 2004-005848). Furthermore, several optical recording media on which an image can be formed by irradiation of laser light are known (for example, see JP-A Nos. 2000-113516, 2001-283464 and 2000-173096). These are convenient in that they can form good visible images. However, it is impossible to recognize on which side of an optical disc an image can be formed. Furthermore, quality control, etc. may become difficult since these optical discs do not comprise supplemental information, such as image forming information, etc.

Therefore, there is a need for an optical disc in which a side on which image forming is carried out and a side on which image forming is not carried out can be easily distinguished and quality control thereof is easy. Furthermore, there is a need for an image forming method, which is suitable for image forming on such an optical disc.

DISCLOSURE OF INVENTION

According to an aspect of the invention, there is provided an optical disc on which a visible image can be formed by irradiation of laser light, which includes: a logo area, on which visible information is indicated; a pre-pit signal area; and an image forming area, on which a visible image can be formed by irradiation of laser light.

According to another aspect of the invention, there is provided an image forming method of forming a visible image by irradiation of laser light on an optical disc, the method including: detecting a pre-pit signal from a pre-pit signal area formed on the optical disc; and forming the visible image based on the result of the detection; wherein the optical disc is the optical disc according to an aspect of the invention.

BRIEF DESCRIPTION OF DRAWINGS

FIG. 4 is a block diagram showing the structure of an example of an optical disc recording apparatus that can use the optical disc of the invention.

BEST MODE FOR CARRYING OUT THE INVENTION

Optical Disc

Figure 1A:
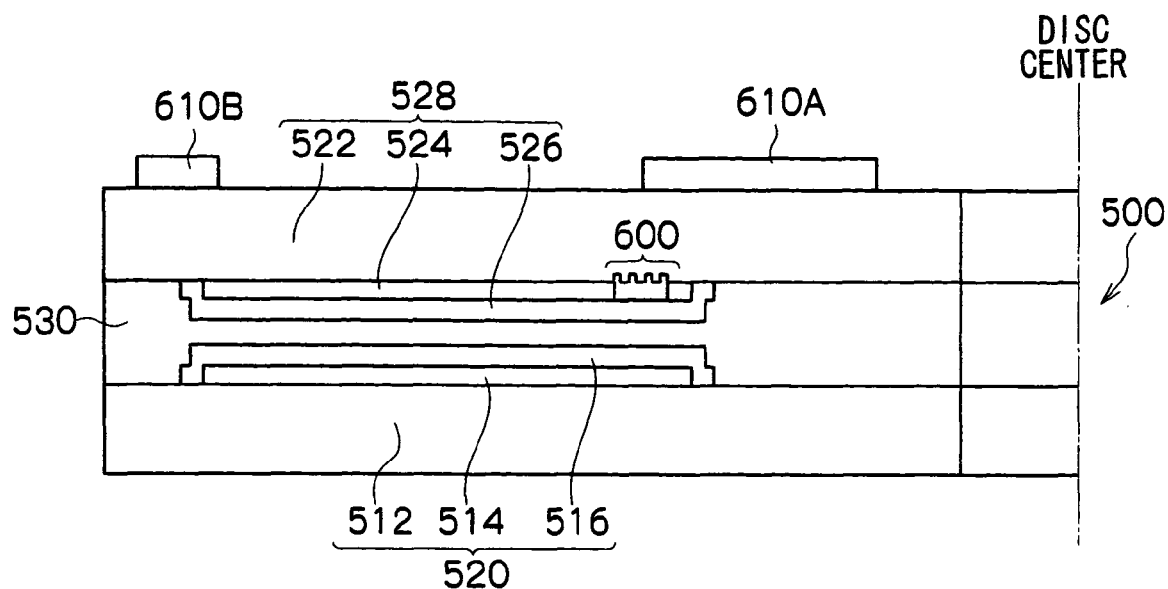
FIGS. 1A and 1B are partial cross-sectional views showing examples of the constitutions of the layers for the optical disc of the present invention.

The optical disc of the present invention is an optical disc on which a visible image can be formed by irradiation of laser light, which comprises a logo area on which visible information is indicated, a pre-pit signal area, and an image forming area on which a visible image can be formed by irradiation of laser light. By the visible information indicated on the logo area, a side on which image forming is carried out can be readily distinguished from a side on which image forming is not carried out. Furthermore, quality control becomes easy due to the pre-pit signal generated from the pre-pit signal area. Furthermore, since the optical disc has an image forming area on which a visible image can be formed by irradiation of laser light, a visible image having high contrast can be formed efficiently.

As used herein, the visible information that is indicated on the logo area refers to an indication for distinguishing a side on which a visible image can be formed by laser light from a side on which an image cannot be formed. Examples of the indication include letters such as "DRAWABLE SIDE", "NON-DRAWABLE SIDE" and the like, and illustrations that enable ready discrimination of whether letters or images can be formed or not, and the indication is provided on the logo area so that, for example, the indication can be recognized from either of the drawable side or the information recording side (recordable side, which means a side on which information can be recorded). For example, for the logo area 702a of FIG. 2B, an indication "LABEL SIDE—DRAWABLE" is provided on the label side, and for the logo area 702b of FIG. 2C, an indication "DATA SIDE—NOT DRAWABLE" is provided on the recordable side. Furthermore, as shown in FIGS. 21A, 21B, 21C and 21D, embodiments in which an indication "DRAWABLE SIDE" is provided on the drawable side of the optical disc (FIG. 21A) and an indication "NON-DRAWABLE SIDE" is provided on the recordable side (rear side) (FIG. 21B) are also possible. Alternatively, embodiments in which an indication "DRAWABLE SIDE" is provided on the drawable side of an optical disc and no indication is provided on the recordable side (rear side) (FIG. 21D) are also possible.

By using such indications showing that a side is drawable or that drawing is prohibited, the insertion of an optical disc into a drive, mistaking a side on which recording is prohibited for a recordable side can be avoided when image recording. Namely, a side on which an image forming can be carried out can be readily distinguished from a side on which image forming cannot be carried out. It is preferable to provide the logo area on the outermost surface of the label side, because printing design can be readily changed while using the same specification of the disc main body.

Examples of the methods for providing such visible information include a method including providing a profiled surface corresponding to the indication on the substrate, printing methods such as screen printing, etc. The profiled surface can be provided on the substrate by providing in advance a corresponding profile on the stamper for forming a substrate, and forming the substrate using the stamper by injection molding.

The pre-pit signal generated from the pre-pit signal area includes at least any one of the following information for image forming, i.e., the outer diameter (120 mm, 80 mm) of the optical disc; recording format of the image-recording layer (write-once, rewritable); intended purpose (multipurpose, specific purpose); configuration of the surface of the substrate at the side having the image-recording layer (presence or absence of a guide groove, having a smooth surface or a rough surface); information about the manufacturer of the disc; verification information, etc.

In the optical disc of the invention, the image forming area may be positioned at a deeper level the logo area. Namely, the image forming area may be placed inside of the optical disc. In this case, the image forming area is not exposed to the atmosphere, dust, etc, and therefore, storability of the image forming area is excellent.

In order to further improve storability, it is preferable to provide an image-recording layer as the image forming area, between the two facing substrates. When an image-recording layer is provided between the substrates, laser beam spots can be narrowed, whereby visibility can be increased and the time period for drawing can be decreased, as compared to recording an image on the surface. Therefore, storability of the image forming area can be improved and the problem of working distance for slim drives can be avoided. Furthermore, a more expensive look can be provided to the optical disc as compared to recording on the surface.

The thickness of each of the facing substrates is preferably 0.3 mm to 0.9 mm. By adjusting the thickness in this range, a space corresponding to the thickness of the substrate is formed between the laser pickup and the image-recording layer, whereby a substantial large working distance can be secured. Therefore, even when a slim-type drive having a small overall thickness is used, it is not necessary to separate the position of an objective lens from the outermost surface of the optical disc by a long distance, which gives a remarkable design advantage for minimizing total thickness of the drive. Furthermore, approximately the same working distance can be readily secured in both cases when an image is recorded on the information-recording layer on the rear side and when an image is recorded on the image-recording layer on the obverse side.

The constitution of the optical disc of the invention may be any of read-only type, write-once type, rewritable type, etc. Among these, write-once type is preferable. The recording format is not specifically limited and examples thereof may include concave and convex pit type, phase transition type, optical magnetic type, dye type, etc. Among these, dye type is preferable.

Furthermore, examples of the constitution of the optical disc of the invention include the followings.

(1) The first layer constitution, which comprises a first substrate, and an information-recording layer and a reflection layer formed on the first substrate in this order; and a second substrate, and an image-recording layer and a reflection layer formed on the second substrate in this order, wherein the reflection layers are adhered via an adhesive layer.

(2) The second layer constitution, which comprises a first substrate, and an information-recording layer, a reflection layer and a protective layer formed on the first substrate in this order; and a second substrate, and an image-recording layer and a reflection layer formed on the second substrate in this order, wherein the protective layer formed on the first substrate and the reflection layer formed on the second substrate are adhered via an adhesive layer.

(3) The third layer constitution, which comprises a first substrate, and an information-recording layer, a reflection layer and a protective layer formed on the first substrate in this order, and a second substrate, and an image-recording layer, a reflection layer and a protective layer formed on the second substrate in this order, wherein the protective layers are adhered via an adhesive layer.

(4) The fourth layer constitution, which comprises a first substrate, and an information-recording layer and a reflection layer formed on the first substrate in this order, and a second substrate, and an image-recording layer, a reflection layer and a protective layer formed on the second substrate in this order, wherein the reflection layer formed on the first substrate and the protective layer formed on the second substrate are adhered via an adhesive layer.

In the layer constitution examples (1) to (4), a pre-pit signal area is provided on the second substrate at the side having the image-recording layer, and a logo area is provided on the second substrate at the side opposite to the side having the image-recording layer.

The above-mentioned examples of the layer constitutions (1) to (4) are provided merely for the purpose of explanation, and an optical enhance layer, a protective layer, etc. can be provided where necessary. Each of the layers may be constituted by a single layer or plural layers. The optical disc of the invention may be one having an outer diameter of 120 mm or one having an outer diameter of 80 mm. Furthermore, the optical disc may be of card type or may have various modified shapes. The logo area may be provided on two positions, i.e., inside circumference and outside circumference, and may have any shape other than ring type. In case where the optical disc has an outer diameter of 80 mm, the outer logo area is not always necessary.

FIG. 1A is a partial cross-sectional view that shows an example of the layer constitution of optical disc 500 of the invention. The optical disc 500 includes a first laminate 520 including a first substrate 512, and an information-recording layer 514 and a first reflection layer 516 formed on the first substrate 512 in this order; and a second laminate 528 including a second substrate 522, and an image-recording layer 524 on which a visible image is recorded by irradiation of laser light and second reflection layer 526 formed on the second substrate in this order. The first laminate 520 and the second laminate 528 are adhered via an adhesive layer 530 so that the first reflection layer 516 and the second reflection layer 526 faces each other.

A pre-pit signal area 600 on which pre-pits have been formed is provided on the face of the second substrate on which the image-recording layer is formed. Furthermore, logo areas 610A and 610B are provided in a concentric fashion on the face opposite to the face on which the image-recording layer is formed of the second substrate 522 by a printing method such as screen printing, offset printing, etc.

Figure 1B:
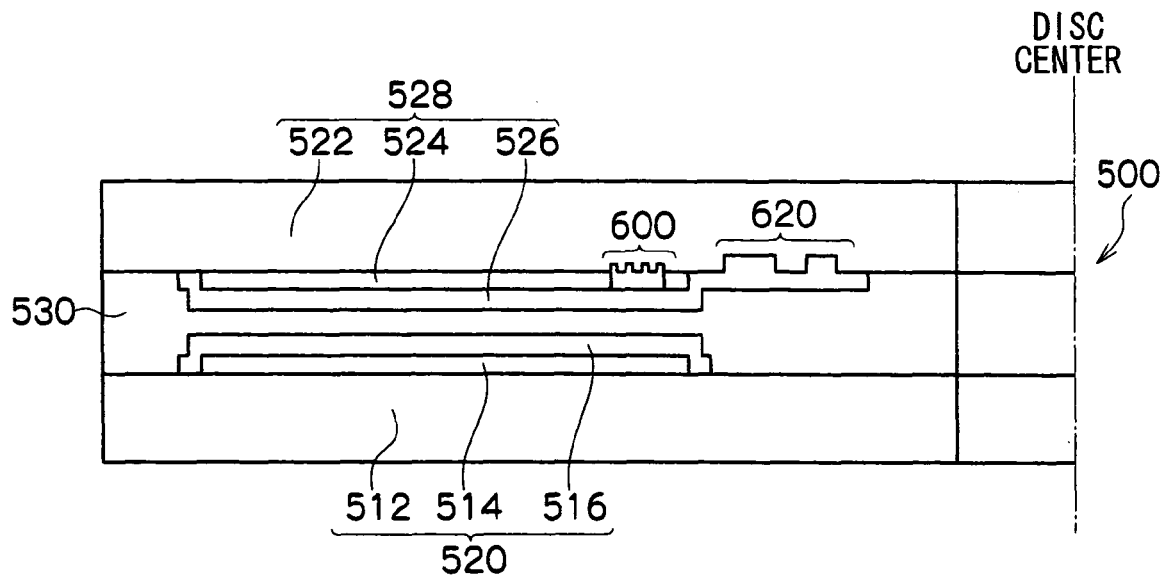

As shown in FIG. 1A, the logo area may be provided on the surface of the optical disc 500 by printing, etc. Alternatively, as shown in FIG. 1B, a logo area 620 that indicates visible information may be formed by providing a indented portion (a concavity and convexity pattern) on the second substrate and forming a reflection layer thereon. According to such embodiment, so-called a pit art can be formed, whereby design property can be improved. In this case, the reflection layer can be formed by extending the reflection layer lined on the image-recording layer, whereby steps for forming the layers can be decreased. The reference characters in FIG. 1B that are same as those of FIG. 1A have the same functions. Therefore, explanations of such reference characters are abbreviated.

As shown in the examples of FIGS. 1A and 1B, so long as the optical disc of the invention has a logo area, a pre-pit signal area and an image forming area, the relationship of the positions of these areas is not specifically limited. In view of the storability of the image forming area, it is preferable that the image forming area is positioned at a deeper level than the logo area (i.e., the image forming area is positioned at a layer that is further from the outer surface than the logo area, for example, the image forming area is positioned at an inner layer than a layer having the logo area). Furthermore, it is preferable that the pre-pit signal area is positioned at a deeper level than the logo area. In view of the visibility of the logo area and the formed image, it is preferable that the optical disc includes the logo area, the pre-pit signal area and the image forming area provided in this order from the inside circumference of the optical disc.

When the logo area, the pre-pit signal area and the image forming area are provided in this order from the inside circumference of the optical disc, and the pre-pit signal area is positioned at a deeper level than the logo area, it is preferable that the outer circumference of the logo area is positioned closer to the outer circumference of the optical disc than the inner circumference of the pre-pit signal area as shown, for example, in FIGS. 1A, 3A, 3B and 3C. By this arrangement, it is possible to attain excellent appearance and also it is possible to ease required positioning accuracy thereby improving suitability for inexpensive mass production and yield.

The optical disc may include, at an outer circumferential area, a printing area (which may be a logo area). In this case, the optical disc may include a logo area, a pre-pit signal area, an image forming area and another logo area, in this order from the inside circumference of the optical disc, as shown in FIG. 1A.

Figure 2A:
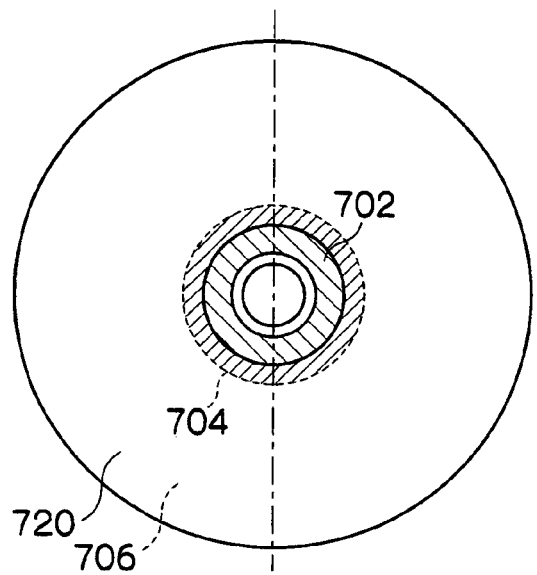
FIGS. 2A, 2B and 2C are top views showing examples of optical discs of the invention.
Figure 2B:
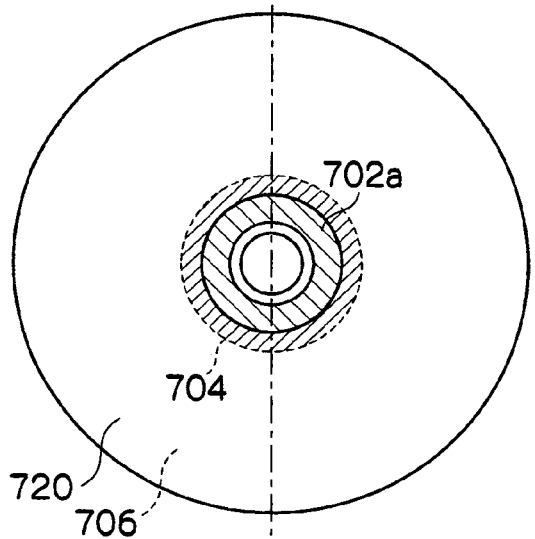
Figure 2C:
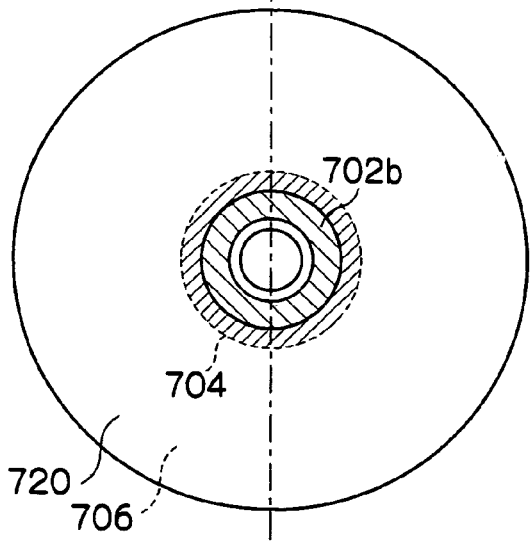
Figure 3A:
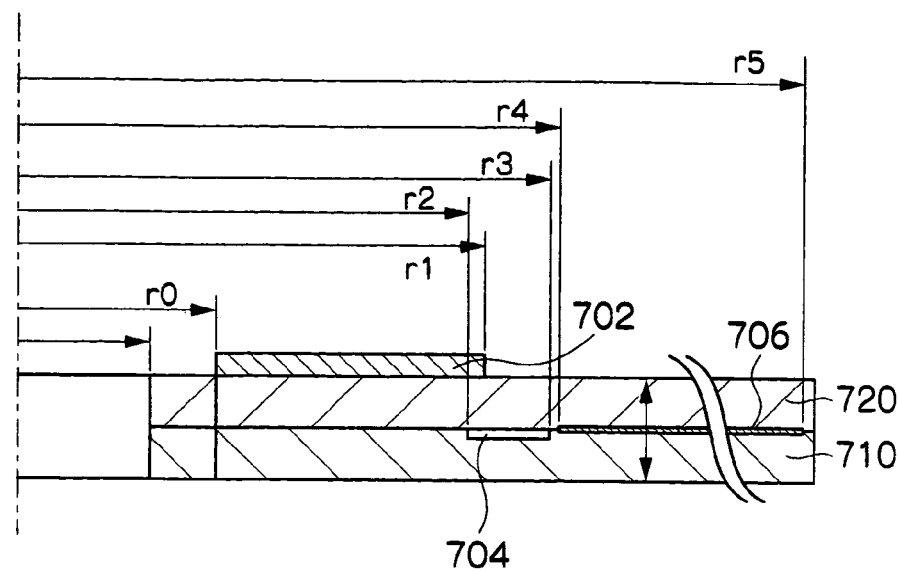
FIGS. 3A, 3B and 3C are partial cross-sectional diagrams showing examples of the optical discs of the invention.
Figure 3B:
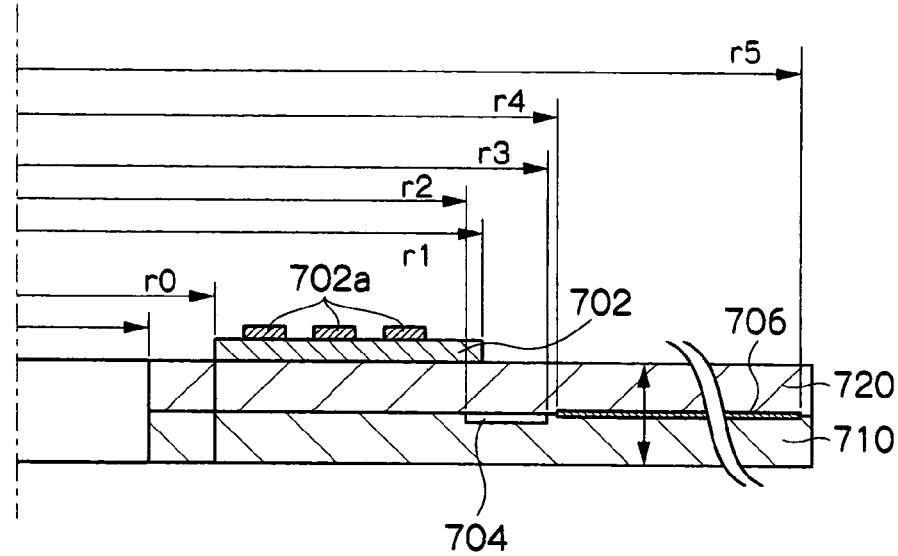
Figure 3C:
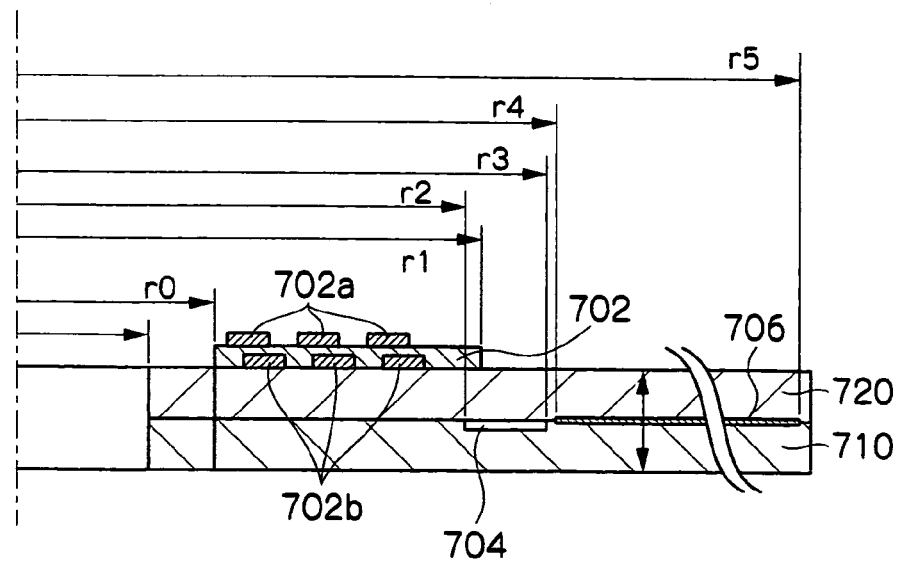

Specifically, the constitutions as shown in FIGS. 2A, 2B and 2C, and 3A, 3B and 3C are preferable. Namely, as shown in FIGS. 2A, 2B and 2C, it is preferable to form a logo area 702 on the label side of a substrate 720, and to form a pre-pit signal area 704 and an image recording area (image-recording layer) 706 toward the outer circumference from the pre-pit signal area 704. Furthermore, the partial sectional structure as shown in FIGS. 3A, 3B and 3C are preferable. That is, it is preferable to form the image recording area 706 and the pre-pit signal area 704, in this order from the outer circumference, between the substrate 710 and the substrate 720. Moreover, it is preferable that the logo area 702 is provided on the upper surface of the substrate 720. According to such constitution, the innermost edge portion of the optical disc can be shielded and the visual effect to users can be improved.

In FIGS. 3A, 3B and 3C, the radius r0, which is an inner circumference end of the logo area 702, is preferably 8 mm to 21 mm, and the radius r1, which is an outer circumference end, is preferably 21 mm to 23 mm (wherein r0<r1). The radius r2, which is an inside circumference end of the pre-pit signal area 704, is preferably 19 mm to 22 mm, and the radius r3, which is an outside circumference end, is preferably 22 mm to 25 mm (wherein r2<r3). The radius r1 may be smaller than the radius r2 (r1<r2), the same as radius r2 (r1=r2) or larger than radius r2 (r1>r2). The radius r1 is preferably the same as radius r2 or larger (r1≧r2), and more preferably, as shown in FIGS. 3A, 3B and 3C, the radius r1 is larger than the radius r2 (r1>r2). The radius r4, which is an inside circumference end of the image recording area 706, is preferably in the range of 23 mm to 25 mm (wherein r3≦r4), and the radius r5, which is an outer circumference end, corresponds to the outermost circumference of the image recording area 706 (wherein r4<r5).

As shown in FIGS. 3B and 3C, the logo area may be constituted by two or more layers. Namely, as shown in FIG.

3B, a logo area 702*a* may be formed using the logo area 702 as a ground. Alternatively, as shown in FIG. 3C, a logo area 702*b*, the logo area 702 that acts as a ground layer and the logo area 702*a* may be formed in this order. According to the embodiment as shown in FIG. 3B, a logo formed on the logo area 702*a* can be prevented from being seen from the side of the substrate 710. According to the embodiment as shown in FIG. 3C, the logo formed on the logo area 702*a* can be seen visually from the side of the substrate 720, and a logo formed on the logo area 702*b* can be seen visually from the side of the substrate 710.

Hereinafter each of the layers and the procedures for forming the layers are explained with referring to the layer constitutions of FIGS. 1A and 1B.

Information-Recording Layer

The information-recording layer is a layer on which code information (coded information) such as digital information is recorded. The type of the information-recording layer is not particularly limited, and may be the concave and convex pit type, the dye type, the phase change type, the magnetooptical type, or the like.

The dye contained in the dye-type information-recording layer may be, for example, a cyanine dye, an oxonol dye, a metal complex dye, an azo dye, or a phthalocyanine dye. Among these dyes, an azo dye and an oxonol dye are preferable.

The dyes disclosed in the following documents are also usable in the invention: JP-A Nos. 4-74690, 8-127174, 11-53758, 11-334204, 11-334205, 11-334206, 11-334207, 2000-43423, 2000-108513, and 2000-158818.

The recording substance is not limited to dyes, and the recording substance may be an organic compound such as a triazole compound, a triazine compound, a cyanine compound, a merocyanine compounds, an aminobutadiene compound, a phthalocyanine compound, a cinnamic acid compound, a viologen compound, an azo compound, an oxonolbenzoxazole compound, or a benztriazole compound. Among these compounds, a cyanine compound, an aminobutadiene compound, a benztriazole compound, and a phthalocyanine compound are preferable.

The information-recording layer is formed by the following processes: a recording substance such as a dye, a binder, and the like are dissolved in a solvent to form a coating liquid, and the coating liquid is applied to the surface of the substrate to form a film, and the film is dried to form an information-recording layer. The concentration of the recording substance in the coating liquid is generally 0.01 to 15% by mass, preferably 0.1 to 10% by mass, more preferably 0.5 to 5% by mass, and still more preferably 0.5 to 3% by mass.

The information-recording layer may be formed by a method such as deposition, sputtering, CVD, or coating using a solvent. Coating using a solvent is a preferable method.

The solvent of the coating liquid may be selected from: esters such as butyl acetate, ethyl lactate, and cellosolve acetate; ketones such as methyl ethyl ketone, cyclohexanone, and methyl isobutyl ketone; chlorinated hydrocarbons such as dichloromethane, 1,2-dichloroethane, and chloroform; amides such as dimethylformamide; hydrocarbons such as methylcyclohexane; ethers such as dibutyl ether, diethyl ether, tetrahydrofuran, and dioxane; alcohols such as ethanol, n-propanol, isopropanol, n-butanol, and diacetone alcohol; fluorine-based solvents such as 2,2,3,3-tetrafluoropropanol; and glycol ethers such as ethylene glycol monomethyl ether, ethylene glycol monoethyl ether, and propylene glycol monomethyl ether.

The solvent may be selected in consideration of the solubility of the dye to be used in the solvent, and only a single solvent may be used or two or more solvents may be used in combination. The coating liquid may further include various additives such as antioxidants, UV absorbers, plasticizers, and lubricants, in accordance with the purpose.

When a binder is used, the binder may be selected from: natural organic high-molecular substances such as gelatin, cellulose derivatives, dextran, rosin, and rubber; hydrocarbon resins such as polyethylene, polypropylene, polystyrene, and polyisobutylene; vinyl resins such as polyvinyl chloride, polyvinylidene chloride, and polyvinyl chloride-polyvinyl acetate copolymers; acrylic resins such as polymethyl acrylate and polymethyl methacrylate; and synthetic organic high-molecular compounds such as polyvinyl alcohol, chlorinated polyethylene, epoxy resins, butyral resins, rubber derivatives, initial condensates of thermosetting resins such as phenol-formaldehyde resins.

When a binder is used as a component of the information-recording layer material, the mass ratio of the amount of the binder to the amount of the dye is preferably in the range of 0.01 to 50, and more preferably in the range of 0.1 to 5.

The coating liquid may be coated by a spray coating method, a spin coating method, a dip coating method, a roll coating method, a blade coating method, a doctor roll method, or a screen printing method. The recording layer may be comprised of a single layer or two or more layers. The thickness of the information-recording layer is generally in the range of 10 to 500 nm, preferably in the range of 15 to 300 nm, and more preferably in the range of 20 to 150 nm.

An antifading agent may be included in the information-recording layer so as to improve the light resistance of the information-recording layer, and the antifading agent may be selected from various antifading agents. The antifading agent is generally a singlet-oxygen quencher. The singlet-oxygen quencher may be selected from singlet-oxygen quenchers disclosed in known published documents such as patent specifications. Specific examples thereof include the singlet-oxygen quenchers disclosed in JP-A No. 58-175693, 59-31194, 60-18387, 60-19586, 60-19587, 60-35054, 60-36190, 60-36191, 60-44554, 60-44555, 60-44389, 60-44390, 60-54892, 60-47069, 68-209995, and 4-25492, and Japanese Patent Publication (JP-B) Nos. 1-38680 and 6-26028, German Patent No. 350399, and *Nihon Kagakukaishi* (1992 October) p. 1141.

The amount of the antifading agent to be used such as a singlet-oxygen quencher is generally 0.1 to 50% by mass based on the amount of the dye, preferably 0.5 to 45% by mass, more preferably 3 to 40% by mass, and still more preferably 5 to 25% by mass based on the amount of the dye.

When the information-recording layer is a phase change information-recording layer, specific examples of the material of the information-recording layer include Sb—Te alloys, Ge—Sb—Te alloys, Pd—Ge—Sb—Te alloys, Nb—Ge—Sb—Te alloys, Pd—Nb—Ge—Sb—Te alloys, Pt—Ge—Sb—Te alloys, Co—Ge—Sb—Te alloys, In—Sb—Te alloys, Ag—In—Sb—Te alloys, Ag—V—In—Sb—Te alloys, and Ag—Ge—In—Sb—Te alloys. Among the substances, Ge—Sb—Te alloys and Ag—In—Sb—Te alloys are preferable since the alloys enable rewriting for many times.

The thickness of the phase change information-recording layer is preferably 10 to 50 nm, and more preferably 15 to 30 nm.

The phase change information-recording layer can be formed by a sputtering method or a vapor-phase thin film deposition method such as a vacuum-deposition method.

First Substrate and Second Substrate

In the optical disc of the invention, the first substrate and the second substrate each may be selected from various materials known as the substrates of the conventional optical discs. Pre-pit(s) may be formed on the image-recording layer side of the second substrate.

The substrate material may be, for example, glass, polycarbonate, an acrylic resin such as polymethyl methacrylate, a vinyl-chloride-based resin such as polyvinyl chloride or a vinyl chloride copolymer, an epoxy resin, amorphous polyolefin, or polyester. Two or more of the above materials may be used together, if desired. The material may be used as a film-like substrate or a rigid substrate. Among the above materials, polycarbonate is preferable from the viewpoints of the moisture resistance, the dimensional stability, the price, and the like.

The second substrate may be prepared via a step for forming a substrate comprising a pre-pit on the surface on which an image-recording layer is formed, using a stamper of the invention as mentioned above. The height of the convexity, which corresponds to the depth of the pre-pit, can be controlled by adjusting the film thickness of the photoresist.

As mentioned above, the thickness of the first substrate and the second substrate is preferably 0.3 mm to 0.9 mm, more preferably 0.5 mm to 0.7 mm, and still more preferably 0.55 mm to 0.65 mm. It is preferable that the first substrate has a groove or a servo signal for tracking. The second substrate may be a substrate having such groove or servo signal for tracking. The track pitch of the groove on the first substrate is preferably in the range of 300 nm to 1600 nm, more preferably in the range of 310 nm to 800 nm. The depth of the groove is preferably in the range of 15 nm to 200 nm, and more preferably in the range of 25 nm to 180 nm.

For recording a high definition image or a computer hologram image on the image-recording layer, the image recording area of the second substrate may also have a groove for tracking. In this case, the track pitch of the groove is preferably in the range of 0.3 µm to 100 µm, more preferably in the range of 0.6 µm to 50 µm, and still more preferably in the range of 0.7 µm to 20 µm, in view of intensity distribution of recording laser.

When tracking is carried out during image recording and the thickness of the substrate on which laser light falls is 0.6 mm, the depth of the groove is preferably 50 nm to 250 nm, more preferably 80 nm to 200 nm, and still more preferably 100 nm to 180 nm. The width of the groove is preferably 100 nm to 600 nm, more preferably 150 nm to 500 nm, and further preferably 200 nm to 450 nm. The optimum range of the shape of the groove may vary depending on the wavelength of laser light, NA, thickness of the substrate, etc.

An undercoat layer may be provided on the surface of the first substrate (the surface having the groove (in the case of ROM, the surface having a pit)), for the purposes of improving the planarity and adhesion and preventing the degradation of the information-recording layer.

Examples of the material of the undercoat layer include: high-molecular weight substances such as polymethyl methacrylate, acrylic acid-methacrylic acid copolymers, styrene-maleic anhydride copolymers, polyvinyl alcohol, N-methylol acrylamide, styrene-vinyltoluene copolymers, chlorosulfonated polyethylene, nitrocellulose, polyvinyl chloride, chlorinated polyolefin, polyester, polyimide, vinyl acetate-vinyl chloride copolymers, ethylene-vinyl acetate copolymers, polyethylene, polypropylene, and polycarbonate; and surface modifiers such as silane coupling agents. The undercoat layer may be formed by: dissolving or dispersing the material for the undercoat layer in an appropriate solvent to form a coating liquid, and then coating the substrate surface with the coating liquid by a coating method such as spin coating, dip coating, or extrusion coating.

The thickness of the undercoat layer is generally 0.005 to 20 µm, more preferably 0.01 to 10 µm.

Meanwhile, in order to avoid reflection of surroundings by mirror surface reflecting light on the visible image formed on the image-recording layer, it is preferable to provide surface roughening treatment on the surface of the second substrate on which an image-recording layer is formed.

Although the method for the surface roughening treatment on the second substrate may be any of various methods and is not specifically limited, it is preferable to apply any of the first to the fifth surface roughening treatments as mentioned below.

(1) The first surface roughening treatment includes surface roughening of the surface of the second substrate on which an image-recording layer is formed, using a stamper in which surface roughening treatment have been provided on one surface to which the second substrate contacts. Specifically, a stamper, which is used for the preparation of the second substrate, is firstly subjected to surface roughening treatment. The method for surface roughening treatment comprises, for example, blast treatment such as sand blast, by which a desired roughness can be afforded. Alternatively, chemical treatment as the fifth surface roughening treatment mentioned below may be used. The stamper is then placed on a mold so that the roughened surface contacts to a resin material for the second substrate, and the material is formed by a known method, whereby the second substrate having a roughened surface on only one side can be prepared. It is preferable that the "desired roughness" has, for example, the maximum height (Rz) of the surface of 0.3 µm to 5 µm, and the average length (RSm) of the roughness curve element of 10 µm to 500 µm.

(2) The second surface roughening treatment includes surface roughening of the surface of the second substrate on which an image-recording layer is formed, using a mold in which surface roughening treatment has been provided on one surface to which the second substrate contacts, after forming of the second substrate. Specifically, surface roughening treatment is provided on one surface (main surface) of a mold for forming the second substrate. The method for surface roughening treatment is similar to that for the first surface roughening treatment. By forming according to a known method using the mold, the second substrate having a roughened surface on only one side can be prepared.

(3) The third surface roughening treatment includes forming the second substrate, applying a resin in which particles have been dispersed on the surface of the second substrate on which an image-recording layer is formed, curing the resin, whereby roughening the surface of the second substrate on which an image-recording layer is formed. Examples of the resin include acrylate UV-curable resin, epoxy thermosetting resin, isocyanate thermosetting resin, etc.

Examples of the particles include inorganic particles such as $SiO_2$, $Al_2O_3$, etc., polycarbonate resin particles, acrylic resin particles, etc. The volume average particle size of the particles is preferably 0.3 µm to 200 µm, and more preferably 0.6 µm to 100 µm. By adjusting the particle size and the amount to be added of the particles, desired roughness can be provided on the roughened surface.

(4) The fourth surface roughening treatment comprises forming the second substrate, providing mechanical processing treatment on the surface of the second substrate on which an image-recording layer is formed, whereby roughening the surface of the second substrate on which an image-recording layer is formed. Although examples of the mechanical processing treatment may include various treatments, it is preferable to apply blast treatment such as sand blast.

(5) The fifth surface roughening treatment include, forming the second substrate, providing chemical treatment on the surface of the second substrate on which an image-recording layer is formed, whereby the surface of the second substrate on which an image-recording layer is formed is roughened. Examples of the chemical treatment include etching treatment by applying a solvent on one surface of the second substrate after forming, or by spraying a solvent using a spray, etc. Preferable examples of the solvent include organic solvents such as dimethylformamide, etc., as well as acidic solvents such as nitric acid, hydrochloric acid, sulfuric acid, etc. Desired roughness can be obtained by adjusting the normality of the acidic solvent or time for applying.

First Reflection Layer and Second Reflection Layer

A first reflection layer is preferably provided adjacent to the information-recording layer and a second reflection layer is preferably provided adjacent to the image-recording layer, for the purpose of improving the reflectance at the time of reproduction of information. The light-reflecting substance, which is the material of the reflection layer, is a substance having a high laser light reflectance. Examples thereof include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi, and stainless steel. Only a single light-reflecting substance may be used, or a combination of two or more light-reflecting substances may be used, or an alloy of two or more light-reflecting substances may be used. The light-reflecting substance is preferably Cr, Ni, Pt, Cu, Ag, Au, Al, or stainless steel, more preferably metallic Au, metallic Ag, metallic Al or an alloy thereof, still more preferably metallic Ag, metallic Al, or an alloy thereof. The reflection layer may be formed on the substrate or on the recording layer, for example by depositing, sputtering, or ion-plating a light-reflecting substance. The thickness of the light reflection layer is generally 10 to 300 nm, preferably 50 to 200 nm. When the disc formed on the first substrate and the disc formed on the second substrate are adhered to each other such that the first and second reflection layers face each other and a UV-curable adhesive is used, the thickness of the first reflection layer or the second reflection layer is preferably 100 nm or less, and more preferably 70 nm or less.

Adhesive Layer

The adhesive layer is a layer for adhering the first laminate 520 and the second laminate 528 in FIGS. 1A and 1B, which is positioned between the first reflection layer 516 and the second reflection layer 526. Examples of the adhesive used for the adhesive layer may include known UV-curable resin, etc.

Image-Recording Layer

On the image-recording layer, a visible image (visible information) desired by the user is recorded such as a character, a figure, or a picture. The visible image may be the disc title, content information, thumbnail of the content, a related picture, a design picture, information on the copyright, the recording date, the recording method, the recording format, or a bar code.

The visible image to be recorded on the image-recording layer refers to a visually recognizable image, and may be any visually recognizable information such as a character, a character string, a picture, and a figure. The visible image may be a textual information such as user authorization information, permitted use period designation information, information on the designated number of permitted use, rental information, resolution designation information, layer designation information, user designation information, information on the owner of the copyright, the copyright number information, manufacturer information, manufacturing date information, selling date information, shop or seller information, use set number information, region designation information, language designation information, use designation information, product user information, or user number information.

The image recording layer may be any layer as long as it can record visible image information such as letters, images, drawings, etc. by irradiation of laser light. In view of formation of clear pits, it is preferable that the image-recording layer includes a dye compound. Examples of the materials of the dye compound that can be suitably used include the dyes as explained for the above-mentioned information-recording layer. In this case, in view of costs, etc., it is preferable that the image-recording layer is formed by spin coating method using a coating liquid including a dye compound.

In the optical disc of the invention, the information-recording layer component (a dye or a phase change recording material) may be the same as or different from the component of the image-recording layer. The components in the respective layers are preferably different since the characteristics desired for the information-recording layer is different from the characteristics desired for the image-recording layer. Specifically, the component of the information-recording layer is preferably excellent in the recording and reproducing characteristics, and the component of the image-recording layer is preferably such a substance that the recorded image has a high contrast. When a dye is used in the image-recording layer, the dye is preferably, among the dyes described above, a cyanine dye, a phthalocyanine dye, an azo dye, an azo-metal complex, or an oxonol dye, from the viewpoint of improving the contrast of the recorded image.

The dye may be a leuco dye. Examples thereof include: crystal violet lactone; phthalide compounds such as 3,3-bis (1-ethyl-2-methylindole-3-yl)phthalide and 3-(4-diethylamino-2-ethoxyphenyl)-3-(1-ethyl-2-methylindole-3-yl)-4-azaphthalide; and fluorane compounds such as 3-cyclohexylmethylamino-6-methyl-7-anilinofluorane, 2-(2-chloroanilino)-6-dibutylaminofluorane, 3-diethylamino-6-methyl-7-anilinofluorane, 3-diethylamino-6-methyl-7-xylidinofluorane, 2-(2-chloroanilino)-6-diethylaminofluorane, 2-anilino-3-methyl-6(N-ethylisopentylamino)fluorane, 3-diethylamino-6-chloro-7-anilinofluorane, 3-benzylethylamino-6-methyl-7-anilinofluorane, and 3-methylpropylamino-6-methyl-7-anilinofluorane.

The image recording layer may be formed by dissolving the dye in a solvent to form a coating liquid and then applying the coating liquid. The solvent may be selected from the solvents cited above as examples of the solvent used in the preparation of the coating liquid for the information-recording layer. Other additives and the coating method are similar to the above-described additives and coating method used for the formation of the information-recording layer.

The thickness of the image-recording layer is preferably 0.01 to 2 μm, more preferably 0.05 to 1 μm, and still more preferably 0.1 to 0.5 μm.

Hereinafter, the protective layer will be described.

Protective Layer

A protective layer may be provided in order to protect the first reflection layer or the information-recording layer physically and chemically.

Examples of the material used in the protective layer include inorganic substances such as ZnS, ZnS—$SiO_2$, SiO, $SiO_2$, $MgF_2$, $SnO_2$, and $Si_3N_4$; and organic substances such as thermoplastic resins, thermosetting resins, and UV-setting resins.

When the protective layer material is a thermoplastic resin or a thermosetting resin, the protective layer may be formed by: dissolving the thermoplastic or thermosetting resin in an appropriate solvent to form a coating liquid, and then coating the coating liquid followed by drying. When the protective layer material is a UV-setting resin, the protective layer may be formed by: dissolving the UV-setting resin in an appropriate solvent to form a coating liquid, and then coating the coating liquid, and then irradiating the coating film with UV light to cure the film. In the above methods, the coating liquids may further include various additives such as antistatic agents, antioxidants, and UV absorbers, in accordance with the purpose. The thickness of the protective layer is preferably 0.1 μm to 1 mm.

As mentioned above, the optical disc of the invention can be applied to so-called a read-only optical disc, which includes the first substrate having a recording portion (pits) on which reproducible information has been recorded by laser light.

Image Forming Method

The image forming method of the invention is a method of forming a visible image on an optical disc by irradiation of laser light, comprising detecting a pre-pit signal from a pre-pit signal area formed on the optical disc of the invention, and forming the visible image based on the result of the detection. First, an optical disc recording apparatus that can be applied to the image forming method of the invention is explained below.

Optical Disc Recording Apparatus

Image recording on the image-recording layer and optical information recording on the information-recording layer may be conducted by a single optical disc drive (a recording apparatus) having functions of recording on the respective recording layers. When a single optical disc drive is used, recording on one of the image-recording layer and the information-recording layer is conducted, and then the disc is turned over, so that the recording on the other recording layer can be conducted.

An optical disc recording apparatus for which the optical disc of the invention can be used suitably is, for example, (1) An optical disc recording apparatus that records information by irradiating the recordable side (for example, the dye recording layer (recording layer)) of an optical disc with a laser light, the recording apparatus comprising: an optical pickup that irradiates the laser light onto the optical disc; an irradiation position adjusting unit that adjusts the position of irradiation of the laser light by the optical pickup onto the optical disc; an image formation control unit that controls the optical pickup and the irradiation position adjusting unit such that a visible image corresponding to image information is formed on the image-recording layer of the optical disc when the optical disc having the recordable side on one side and an image-recording layer on the other side is set with the image-recording layer facing the optical pickup; and a beam spot control unit that controls the optical pickup such that the beam spot size of the laser light irradiated onto the image-recording layer by the optical pickup at the formation of the visible image is greater than the beam spot size of the laser light irradiated by the optical pickup onto the recordable side at the recording of information.

According to this arrangement, when the image-recording layer of the optical disc is irradiated with the laser light in accordance with image information, a visible image corresponding to the image information can be formed by change in the reflectance of the image-recording layer caused by the change in the absorbance of the image-recording layer. Since the laser light is irradiated onto the image-recording layer of the optical disc with an increased beam spot size upon formation of the visible image, a larger area is irradiated with the laser light during one revolution of the optical disc, and the time required to form the visible image can be reduced. An excellent image can be obtained when this method is employed on the optical disc of the invention. Furthermore, the above image management information can be obtained by pre-pit signals from the pre-pit signal area of the optical disc. In the optical disc recording apparatuses of other embodiments described below, the administrative information of the image can be obtained in the same way.

The optical disc recording apparatus of another aspect is (2) an optical disc recording apparatus that records information by irradiating the recordable side of an optical disc with a laser light, the recording apparatus comprising: an optical pickup that irradiates the laser light onto the optical disc; an irradiation position adjusting unit that adjusts the position of irradiation of the laser light by the optical pickup onto the optical disc; an image formation control unit that controls the optical pickup and the irradiation position adjusting unit such that a visible image corresponding to image information is formed on the image-recording layer of the optical disc when the optical disc having the recordable side on one side and an image-recording layer on the other side is set with the image-recording layer facing the optical pickup, and such that the intensity of the laser light irradiated onto the image-recording layer is selected, based on the image information, from a first intensity which hardly changes the image-recording layer and a second intensity which is greater than the first intensity and which changes the image-recording layer; and a servo unit that detects information about the laser light irradiated by the optical pickup onto the optical disc and controls the optical pickup based on the detection results such that the desired laser light is irradiated. When the intensity of the laser light irradiated by the optical pickup under the control based on the image information is maintained at the second intensity over a predetermined period of time, the image formation control unit changes the intensity of the laser light irradiated from the optical pickup to the first intensity irrespective of the image information and maintains the first intensity for a predetermined period of time. The servo unit controls the optical pickup based on the detection results of the information about the laser light irradiated at the first intensity.

According to this arrangement, when the laser light is irradiated onto the image-recording layer of the optical disc based on image information, the reflectance changes as the absorbance of the image-recording layer changes, whereby a visible image corresponding to the image data can be formed. At visible image formation, even when the intensity of the laser light corresponding to the image data is maintained for a long time at the second intensity that changes the image-recording layer, the laser light at the first intensity that hardly changes the image-recording layer is irradiated for laser light control irrespective of the image data, so that laser light control based on the irradiation results can be conducted. An excellent image can be obtained when this method is employed on the optical disc of the invention.

The optical disc recording apparatus of another aspect is (3) an optical disc recording apparatus that records information by irradiating the recordable side of an optical disc with a laser light, the recording apparatus comprising: an optical pickup that irradiates the laser light onto the optical disc; an irradiation position adjusting unit that adjusts the position of irradiation of the laser light by the optical pickup onto the optical disc; an image formation control unit that controls the optical pickup and the irradiation position adjusting unit such that a visible image corresponding to image information is formed on the recordable side of the optical disc, and such that the intensity of the laser light irradiated onto the recordable side is selected, based on the image information, from a first intensity which hardly changes the recordable side and a second intensity which is greater than the first intensity and which changes the recordable side; and a servo unit that detects information about the laser light irradiated by the optical pickup onto the optical disc and controls the optical pickup based on the detection results such that the desired laser light is irradiated. When the intensity of the laser light irradiated by the optical pickup under the control based on the image information is maintained at the second intensity over a predetermined period of time, the image formation control unit changes the intensity of the laser light irradiated from the optical pickup to the first intensity irrespective of the image information and maintains the first intensity for a predetermined period of time. The servo unit controls the optical pickup based on the detection results of the information about the laser light irradiated at the first intensity.

According to this arrangement, when the laser light is irradiated onto the image-recording layer of the optical disc based on image information, a visible image corresponding to the image data can be formed by the change in the reflectance the recording layer. At visible image formation, even when the intensity of the laser light corresponding to the image data is maintained for a long time at the second intensity that changes the recordable side, the laser light at the first intensity that hardly changes the recordable side is irradiated for laser light control irrespective of the image data, so that laser light control based on the irradiation results can be conducted. An excellent image can be obtained when this method is employed on the optical disc of the invention.

The optical disc recording apparatus of another aspect is (4) an optical disc recording apparatus that records information by irradiating the recordable side of an optical disc with a laser light, the recording apparatus comprising: an optical pickup that irradiates the laser light onto the optical disc; an irradiation position adjusting unit that adjusts the position of irradiation of the laser light by the optical pickup onto the optical disc; an image formation control unit that controls the optical pickup and the irradiation position adjusting unit such that a visible image corresponding to image information is formed on the image-recording layer of the optical disc when the optical disc having the recordable side on one side and an image-recording layer on the other side is set with the image-recording layer facing the optical pickup; and a relative position adjustment unit that adjusts the relative positional relationship between the optical pickup and the side of the optical disc facing the optical pickup based on whether the side of the optical disc facing the optical pickup is the image-recording layer or the recordable side when the optical disc is set in the optical disc recording apparatus.

According to this arrangement, when the laser light is irradiated onto the image-recording layer of the optical disc based on image information, a visible image corresponding to the image information can be formed by change in reflectance accompanying the change in the absorbance of the image-recording layer. When the optical disc is loaded, the positional relationship between the optical pickup and the side facing the optical pickup can be adjusted based on whether the optical pickup faces the image-recording layer or the recordable side. Therefore, even if the distance between the optical pickup and the side facing the optical pickup varies depending on whether the optical disc is set with its recordable side facing the optical pickup or with its image-recording layer facing the optical pickup, problems derived from the variation of the distance, which may impair various types of controls such as focus control, can be avoided. An excellent image can be obtained when this method is employed on the optical disc of the invention.

The optical disc recording apparatus of another aspect is (5) an optical disc recording apparatus that records information by irradiating the recordable side of an optical disc with a laser light, the recording apparatus comprising: an optical pickup that irradiates the laser light onto the optical disc; an irradiation position adjusting unit that adjusts the position of irradiation of the laser light by the optical pickup onto the optical disc; a servo unit that controls the irradiation position adjusting unit when the optical disc having a recordable side with a spiral guide groove on one side and an image-recording layer on the other side is set with the image-recording layer facing the optical pickup, such that the laser light is irradiated along the guide groove based on the reflection, on the optical disc, of the laser light irradiated by the optical pickup; and image formation control unit that controls the laser light irradiated from the optical pickup while the irradiation position of the laser light is moved along the guide groove by the servo unit, such that a visible image corresponding to image information is formed on the image-recording layer of the optical disc. An excellent image can be obtained when this method is employed on the optical disc of the invention.

According to this arrangement, when the laser light is irradiated onto the image-recording layer of the optical disc based on the image information, the reflectance is changed as the absorbance of the image-recording layer is changed, and a visible image corresponding to the image information can be formed. In this process, the visible image can be formed without conducting a more complex laser-light irradiation position adjustment than when recording is conducted on the recordable side, such as detecting the guide groove provided on the recordable side and moving the laser-light irradiation position along the detected guide groove.

The optical disc recording apparatus of another aspect is (6) an optical disc recording apparatus that records information by irradiating the recordable side of an optical disc with a laser light, the recording apparatus comprising: an optical pickup that irradiates the laser light onto the optical disc; a rotation driving unit that rotates the optical disc; a clock signal output unit that outputs clock signals having a frequency corresponding to the speed of the rotation of the optical disc driven by the rotation driving unit; an image formation control unit that controls the optical pickup such that a visible image corresponding to image information is formed on the image-recording layer of the optical disc when the optical disc having the recordable side on one side and an image-recording layer on the other side is set with the image-recording layer facing the optical pickup, the image formation control unit also controlling the laser light irradiated from the optical pickup based on the image information at each cycle of the clock signal from the signal output unit; a rotation detecting unit that detects that the optical disc has been rotated by the rotation driving unit for one revolution from the predetermined reference position; and an irradiation position adjusting unit that moves the irradiation position of the laser light emitted from the optical pickup for a predetermined distance in the predetermined radius direction on the optical disc set in the optical disc recording apparatus when each revolution of the optical disc from the predetermined reference position is detected by the rotation detecting unit upon irradiation of laser light by the optical pickup for the formation of the visible image on the image-recording layer of the optical disc.

According to this arrangement, when the laser light is irradiated onto the image-recording layer of the optical disc based on the image information, the reflectance is changed as the absorbance of the image-recording layer is changed, and a visible image corresponding to the image information can be formed. In the visible image forming process, the laser light irradiation control is conducted for visible image formation at every cycle of the clock signal having a frequency corresponding to the rotation speed of the optical disc, i.e., at every time the optical disc rotates for a certain angle; therefore, a visible image whose contents (e.g., density) are in accordance with the image data can be formed at each positions of even angular spacing. An excellent image can be obtained when this method is employed on the optical disc of the invention.

The optical disc recording apparatus of another aspect is (7) an optical disc recording apparatus that records information by irradiating the recordable side of an optical disc with a laser light, the recording apparatus comprising: an optical pickup that irradiates the laser light onto the optical disc; a rotation driving unit that rotates the optical disc; a rotation detecting unit that detects that the optical disc has been rotated by the rotation driving unit for one revolution from the predetermined reference position; an image formation control unit that controls the optical pickup such that a visible image corresponding to image information is formed on the image-recording layer of the optical disc when the optical disc having the recordable side on one side and an image-recording layer on the other side is set with the image-recording layer facing the optical pickup; and an irradiation position adjusting unit that moves the irradiation position of the laser light emitted from the optical pickup for a predetermined distance in the predetermined radius direction on the optical disc set in the optical disc recording apparatus when each revolution of the optical disc from the predetermined reference position is detected by the rotation detecting unit upon irradiation of laser light by the optical pickup for the formation of the visible image on the image-recording layer of the optical disc. The image formation control unit orders the optical pickup to emit laser light such that the visible image is formed from the predetermined reference position of the image-recording layer of the optical disc rotated by the rotation driving unit, and such that the laser light for visible image formation is not emitted when the laser-light irradiation position is within the range from a predetermined amount before the predetermined reference position of the optical disc to the predetermined reference position.

According to this arrangement, when the laser light is irradiated onto the image-recording layer of the optical disc based on the image information, the reflectance is changed as the absorbance of the image-recording layer is changed, and a visible image corresponding to the image information can be formed. In the visible image forming process, while the optical disc is rotated, the visible image is formed by irradiation of the laser light from the reference position on the optical disc; however, the laser light irradiation for visible image formation is not conducted on the region just before the laser light irradiation position returns to the reference position. Therefore, even when, for certain reasons such as unstable rotation of the optical disc, laser light irradiation control is disturbed and the laser light irradiation is conducted for more than one revolution of the optical disc from the reference position, so that the irradiation position passes the reference position again (i.e., the laser light irradiation position moves to the position overlapping the position which has been already irradiated with the laser light), the irradiation of the laser light for visible image formation is prevented, whereby the deterioration of the quality of the resultant visible image can be prevented.

The optical disc recording apparatus of another aspect is (8) An optical disc recording apparatus that records information by irradiating the recordable side of an optical disc with a laser light, the recording apparatus comprising: an optical pickup that irradiates the laser light onto the optical disc; an irradiation position adjusting unit that adjusts the position of irradiation of the laser light by the optical pickup onto the optical disc; an disc identifying unit that obtains disc identifying information for identifying the type of the optical disc set in the optical disc recording apparatus; and an image formation control unit that controls the optical pickup and the irradiation position adjusting unit such that a visible image corresponding to image information is formed on the image-recording layer of the optical disc when the optical disc having the recordable side on one side and an image-recording layer on the other side is set with the image-recording layer facing the optical pickup, the image formation control unit controlling the optical pickup and the irradiation position adjusting unit according to the type of the optical disc identified by the disc identifying unit.

According to this arrangement, when the laser light is irradiated onto the image-recording layer of the optical disc based on the image information, the reflectance is changed as the absorbance of the image-recording layer is changed, and a visible image corresponding to the image information can be formed. In this visible-image forming process, control for visible image formation can be performed in accordance with the type of the loaded disc.

The optical disc recording apparatus of another aspect is (9) an optical disc recording apparatus comprising: an optical pickup that irradiates laser light to an optical disc; a modulating unit that modulates information supplied from the outside; and a laser light control unit that controls the laser light irradiated from the optical pickup based on the information supplied from the modulating unit. The optical disc recording apparatus further comprises: an inhibiting unit that inhibits the modulation of the image information supplied from the outside by the modulating unit when a visible image is formed on the image-recording layer of the optical disc having the recordable side on one side and the image-recording layer on the other side; and an image formation control unit that controls the laser light control unit such that a visible image corresponding to unmodulated image information supplied from the modulating unit is formed on the image-recording layer of the optical disc when the optical disc is set with the image-recording layer facing the optical pickup.

According to this arrangement, when the laser light is irradiated onto the image-recording layer of the optical disc based on the image information, the reflectance is changed as the absorbance of the image-recording layer is changed, and a visible image corresponding to the image information can be formed. In this visible image forming process, since the operation of the modulating unit for modulating the recording data is inhibited at the time the information is recorded on the recordable side, the image data are not modulated. Therefore, a special data transmission structure is not required to form a visible image corresponding to the image information, and the data transmission structure used for recording information on the recordable side can be employed also in the image formation.

The optical disc recording apparatus of another aspect is (10) an optical disc recording apparatus that records information by irradiating the recordable side of an optical disc with a laser light, the recording apparatus comprising: an optical pickup that irradiates laser light onto the optical disc; an irradiation position adjusting unit that adjusts the position of irradiation of the laser light by the optical pickup onto the optical disc; and an image formation control unit that controls the optical pickup and the irradiation position adjusting unit such that a visible image corresponding to image information is formed on the image-recording layer of the optical disc when the optical disc having the recordable side on one side and an image-recording layer on the other side is set with the image-recording layer facing the optical pickup. The image formation control unit controls the laser light irradiated from the optical pickup according to the gradation degree indicated in the image information.

According to this arrangement, when the laser light is irradiated onto the image-recording layer of the optical disc based on the image information, the reflectance is changed as the absorbance of the image-recording layer is changed, and a visible image corresponding to the image information can be formed. In the visible image forming process, laser light control corresponding to the gradation of the respective positions (coordinate locations) on the image-recording layer indicated in the image data can be performed, and a visible image with gradation can be formed.

The optical disc recording apparatus of another aspect is (11) an optical disc recording apparatus that records information by irradiating the recordable side of an optical disc with a laser light, the recording apparatus comprising: a rotating unit that rotates the optical disc; an optical pickup that irradiates laser light onto the above side of the optical disc rotated by the rotating unit and is movable along the radius diameter of the optical disc; and a laser level control unit that controls the level of the laser light emitted from the optical pickup upon formation of a visible image on the image-recording layer, and controls the level of the laser light based on the image data representing the visible image to be formed such that the laser level is set at a first intensity that hardly changes the recording layer and the image-recording layer of the optical disc or at a second intensity that hardly changes the recording layer but changes the color of the image-recording layer.

According to this arrangement, when an optical disc of the invention is used, information recording can be conducted on the recording layer by irradiation with laser light similarly to conventional information recording, and, in addition, a visible image can be recorded on the image-recording layer. Further, since both of the information recording and the visible image formation can be conducted by irradiation of the laser light onto the same side of the optical disc, it is not necessary for users to do troublesome operations such as reversing and reloading of the optical disc.

A method of forming an image according to the invention uses an optical disc recording apparatus having an optical pickup that conducts information recording by irradiating laser light onto the recordable side of the optical disc. The method includes forming a visible image on the image-recording layer provided on the side of the optical disc that is opposite to the recordable side. The method includes controlling the laser light emitted by the optical pickup such that a visible image corresponding to image information is formed on the image-recording layer of the optical disc while the irradiation position of the laser light emitted by the optical pickup is moved along a predetermined spiral or concentric path on the image-recording layer. In the method, unit areas are defined by dividing the optical disc into some sector-shaped regions, and each unit area is defined as the area containing the predetermined number of the adjacent spiral or concentric paths in each region. The irradiation timing of the laser light onto the paths in the unit area is controlled to express the contrasting density of each unit area in the visible image. As explained in the above, the image management information of the image can be obtained by pre-pit signals from the pre-pit signal area of the optical disc.

According to this method, when the laser light is emitted in accordance with the administrative information of the image obtained by detecting the pre-pit signal from the prepit signal area, the reflectance of the image-recording layer can be changed as the absorbance of the image-recording layer is changed, and a visible image can be formed in accordance with the image information. In this visible image forming process, the laser irradiation timing control can be performed in accordance with the gradation level of each position (each coordinate location) on the image-recording layer indicated in the image information, and a visible image with gradation can be obtained.

It is preferable that, in the forming a visible image, the laser wavelength is 630 nm to 680 nm and the numerical aperture is 0.6 to 0.7. Using a pickup under such conditions, the same pickup as that for a recordable DVD can be shared. Furthermore, recording can be carried out while obtaining a tilt margin and a beam spot diameter that are suitable for a substrate having a thickness of 0.3 mm to 0.9 mm, more preferably 0.5 mm to 0.7 mm, still more preferably 0.55 mm to 0.65 mm. When such a pickup is used, it is preferable that the pickup has a constitution of a general pickup for a DVD using astigmatic focus error detection for focus servo system and using push-pull method, three beam method, etc. as tracking method.

A. Specific Structures of the Optical Disc Recording Apparatuses

The optical disc recording apparatus emits a laser beam to irradiate the recordable side of an optical disc to record information. The optical disc recording apparatus has a function of not only recording information to the recordable side, but also emitting the laser beam to irradiate the image-recording layer on the side of the optical disc opposite to the recordable side, and forming a visible image corresponding to the image information. Such an optical disc recording apparatus can record a visible image also on the information-recording layer for digital data recording if the optical disc uses a specific dye.

Structures of Optical Disc Recording Apparatuses

FIG. 4 is a block diagram showing the configuration of an optical disc recording apparatus. As is shown in FIG. 4, an optical disc recording apparatus 100, which is connected to a host personal computer (PC) 110, comprises: an optical pickup 10, a spindle motor 11, an RF (Radio Frequency) amplifier 12, a servo circuit 13, a decoder 15, a control unit 16, an encoder 17, a strategy circuit 18, a laser driver 19, a laser power control circuit 20, a frequency generator 21, a stepping motor 30, a motor driver 31, a motor controller 32, a PLL (Phase Locked Loop) circuit 33, an FIFO (First In First Out) memory 34, a drive pulse generator 35, and a buffer memory 36.

The spindle motor 11 rotates the optical disc D on which data is to be recorded, and the servo circuit 13 controls the number of revolutions of the optical disc D. Since recording the optical disc recording apparatus 100 in this embodiment employs the CAV (Constant Angular Velocity) method, the spindle motor 11 rotates at a predetermined angular velocity instructed by the control unit 16.

Figure 5:
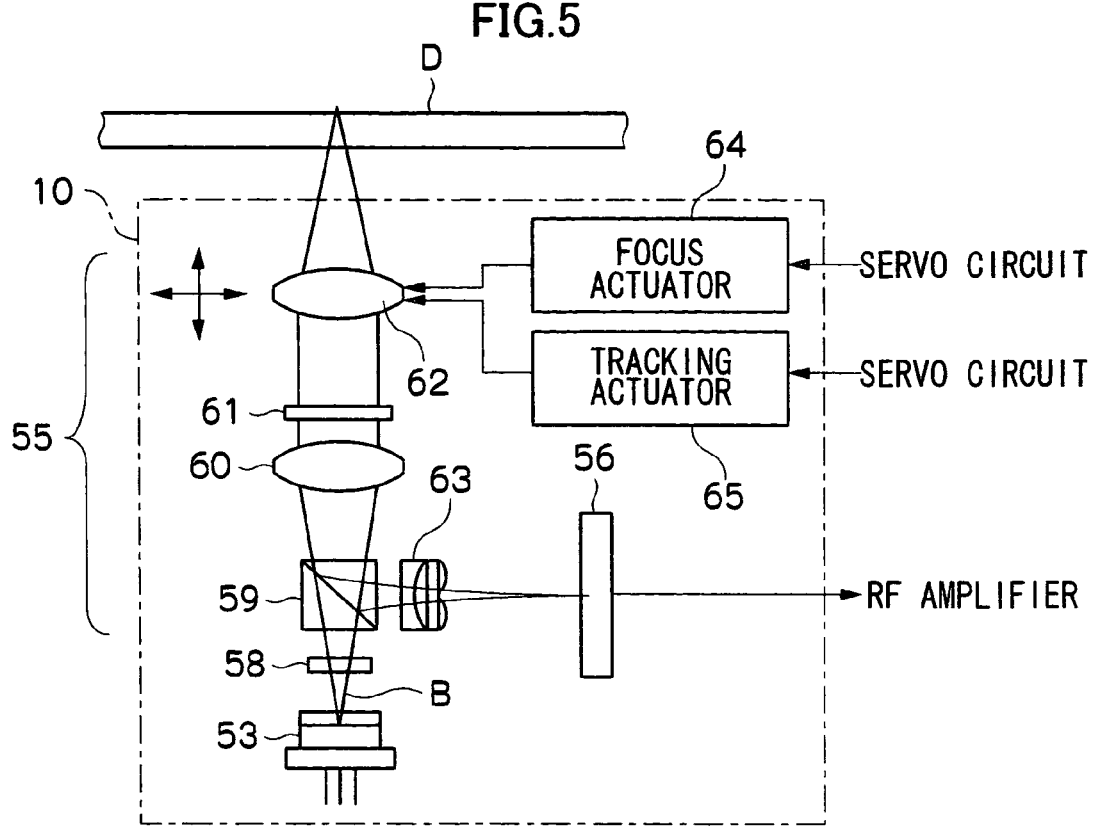
FIG. 5 is a diagram showing the structure of the optical pickup which is a component of the optical disc recording apparatus.

The optical pickup 10 is a unit that emits a laser beam for irradiating the optical disc D that is rotated by the spindle motor 11, and its structure is shown in FIG. 5. As is shown in FIG. 5, the optical pickup 10 includes: a laser diode 53 for emitting a laser beam B; a diffraction grating 58; an optical system 55 for focusing the laser beam B on the surface of the optical disc D; and a light-receiving element 56 for receiving a reflected beam.

In the optical pickup 10, the laser diode 53 receives a drive current from the laser driver 19 (see FIG. 4), and emits the laser beam B at an intensity consonant with the drive current. In the optical pickup 10, the laser beam B emitted by the laser diode 53 is split, by a diffraction grating 58, into a primary beam, a preceding beam and a succeeding beam, and these three beams pass through a polarized beam splitter 59, a collimator lens 60, a ¼ wavelength plate 61 and an object lens 62 and are focused on the surface of the optical disc D. The three laser beams are reflected by the face of the optical disc D and again pass through the object lens 62, the ¼ wavelength plate 61 and the collimator lens 60, and are reflected by the polarized beam splitter 59. From there, the reflected beams are transmitted through a cylindrical lens 63 to the light-receiving element 56, which receives the reflected beams and outputs them as light reception signals to the RF amplifier 12 (see FIG. 4). Thereafter, the RF amplifier 12 transmits these signals to the control unit 16 and the servo circuit 13.

The object lens 62 is held by a focus actuator 64 and a tracking actuator 65 so that it can be moved in the light axial direction of the laser beam B and in the direction of the diameter of the optical disc D. In accordance with a focus error signal and a tracking error signal supplied by the servo circuit 13 (see FIG. 4), the focus actuator 64 and the tracking actuator 65 move the object lens 62 in the light axial direction and in the direction of the radius of optical disc D. The servo circuit 13 generates the focus error signal and the tracking error signal based on the light reception signals transmitted by the light-receiving element 56 through the RF amplifier 12, and moves the object lens 62, in the manner described above, so that the focusing and tracking operations can be performed.

The optical pickup 10 includes a front monitor diode (not shown), and when the laser beam is emitted by the laser diode 53, the front monitor diode receives the beam and generates a current that is transmitted from the optical pickup 10 to the laser power control circuit 20 in FIG. 4.

The RF amplifier 12 amplifies an RF signal that is produced by EFM (Eight to Fourteen Modulation) and is received from the optical pickup 10, and outputs the resultant RF signal to the servo circuit 13 and the decoder 15. For reproduction, the decoder 15 performs EFM demodulation for the EFM modulated RF signal received from the RF amplifier 12 and generates reproduction data.

Transmitted to the servo circuit 13 is an instruction signal from the control unit 16, an FG pulse signal from the frequency generator 21 that has a frequency consonant with the number of revolutions of the spindle motor 11, and an RF signal from the RF amplifier 12. Based on these signals, the servo circuit 13 rotates the spindle motor 11, and conduct focusing or tracking control of the optical pickup 10. The method used for driving the spindle motor 11 to record information on the recordable side (information-recording layer) of the optical disc D or to form a visible image on the image-recording layer (see FIGS. 1A and 1B) of the optical disc D can be either a CAV (Constant Angular Velocity) method of driving the optical disc D at a predetermined angular velocity, or a CLV (Constant Linear Velocity) method of rotating the optical disc D to obtain a predetermined linear velocity for recording. The optical disc recording apparatus 100 explained by FIG. 4 and the like employs the CAV method, and the servo circuit 13 rotates the spindle motor 11 at a predetermined angular velocity designated by the control unit 16.

Stored in the buffer memory 36 is information (hereinafter referred to as recording data) to be recorded on the recordable side of the optical disc D and information (hereinafter referred to as image information) corresponding to a visible image that is to be formed on the image-recording layer of the optical disc D. The recording data stored in the buffer memory 36 are output to the encoder 17, while the image information is output to the control unit 16.

The encoder 17 performs EFM modulation on the recording data received from the buffer memory 36, and outputs the obtained recording data to the strategy circuit 18. The strategy circuit 18, for example, performs a time axis correction process on the EFM signal received from the encoder 17, and outputs the resultant EFM signal to the laser driver 19.

The laser driver 19, under the control of the laser power control circuit 20, drives the laser diode 53 (see FIG. 5) of the optical pickup 10 in accordance with a signal which is received from the strategy circuit 18 and which is modulated based on the recording data.

The laser power control circuit 20 controls the power for a laser beam emitted by the laser diode 53 (see FIG. 5) of the optical pickup 10. Specifically, the laser power control circuit 20 controls the laser driver 19 such that the optical pickup 10 emits the laser beam at an intensity that matches the optimum target value of the laser power designated by the control unit 16. The laser power control conducted by the laser power control circuit 20 is feedback control for the emission of the laser beam at the target intensity by the optical pickup 10, using the value of the current supplied by the front monitor diode of the optical pickup 10.

Figure 6:
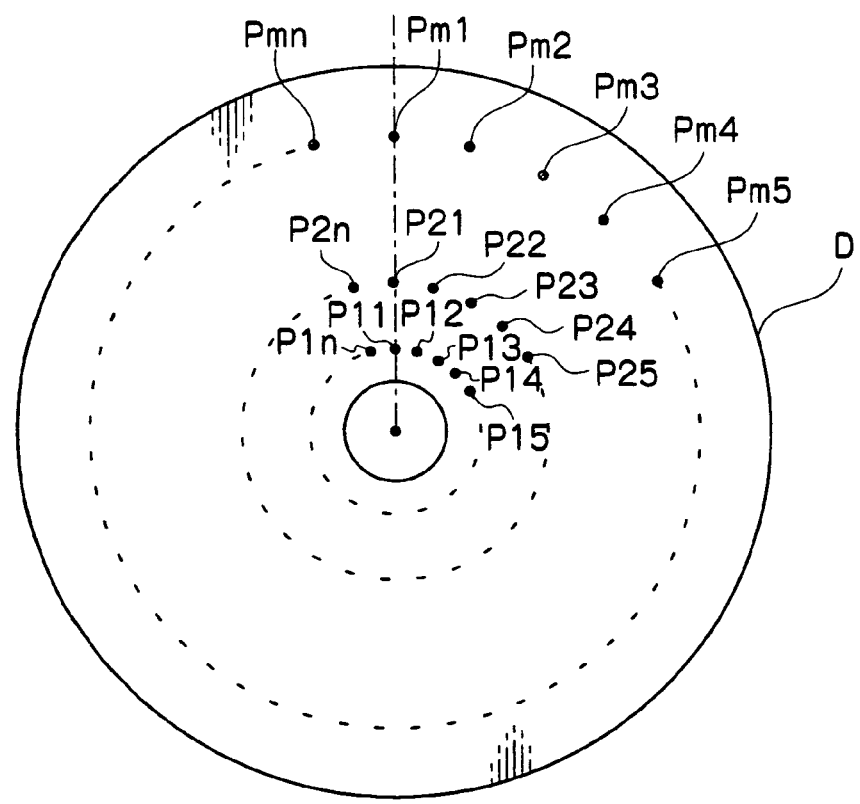
FIG. 6 is a diagram which explains the content of the image data used for the formation of a visible image on the image-recording layer of the optical disc by the optical disc recording apparatus.

The image information supplied by the host PC 110 and stored in the buffer memory 36 are transmitted through the control unit 16 to the FIFO memory 34 and are stored therein. In this case, the image information stored in the FIFO memory 34, i.e., the image information supplied to the optical disc recording apparatus 100 by the host PC 110, includes the following information. The image information is used to form a visible image on the face of the optical disc D, and as is shown in FIG. 6, information representing a gradation level (density) is written for each of n coordinate points (indicated by black dots) on each of multiple concentric circles centered on the center O of the optical disc D. The image information represents the gradation level for each of the coordinate points, in order from the coordinate points P11, P12, . . . and P1n, belonging to the innermost circle, to coordinate points P21, P22, . . . and P2n, belonging to the externally adjacent circle, to the coordinate points along the externally adjacent circle and up to coordinate points Pmn on the outermost circle. The data representing the gradation levels of the coordinate points along the polar coordinate are transmitted to the FIFO memory 34 in the above order. It should be noted that FIG. 6 is a schematic diagram for clearly showing the positional relationships of the coordinates, and the actual coordinate points are disposed at a higher density. When the host PC 110 employs a commonly-used bit-map format to prepare image information to be formed on the image-recording layer of the optical disc D, the host PC 110 need only convert the bit map data into the polar coordinate data described above and transmit the obtained image information to the optical disc recording apparatus 100.

To form a visible image on the image-recording layer of the optical disc D based on the thus received image information, the PLL circuit 33 transmits an image recording clock signal to the FIFO memory 34. Every time the FIFO memory 34 receives the clock pulse of the image recording clock signal, the piece of information representing the gradation level of a coordinate point stored before any other pieces of information representing the gradation level is output by the FIFO memory 34 to the drive pulse generator 35.

Figure 7A:
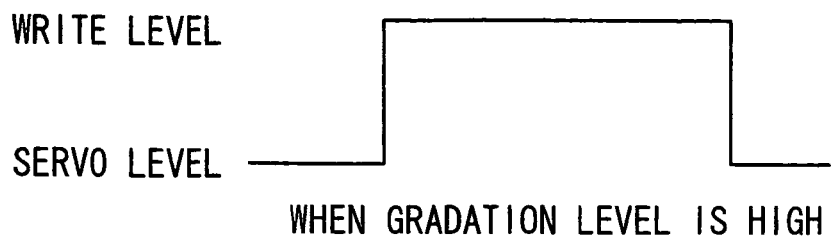
FIGS. 7A and 7B are diagrams explaining the laser irradiation control for expressing the gradation of the image employed upon formation of a visible image on the image-recording layer of the optical disc of the invention by the optical disc recording apparatus.
Figure 7B:
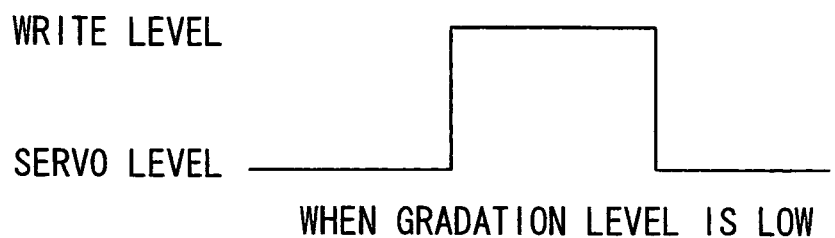

The drive pulse generator 35 generates a drive pulse to control the timing at which a laser beam is to be emitted by the optical pickup 10. The drive pulse generator 35 generates a drive pulse having a pulse width consonant with information which is read from the FIFO memory 34 and which represents a gradation level for each coordinate point. For example, when the gradation level of a specific coordinate point is comparatively high (the density is high), as is shown in FIG. 7A, the drive pulse generator 35 generates a drive pulse having an extended pulse width with respect to a write level (the second intensity). When the gradation level is comparatively low, as is shown in FIG. 7B, the drive pulse generator 35 generates a drive pulse having a reduced pulse width of the write level. The write level is such a power level that when the laser beam at this level is emitted and irradiated to the image-recording layer of the optical disc D, the reflectance of the image-recording layer is clearly changed. And when the above described drive pulse is transmitted to the laser driver 19, for a period corresponding to the pulse width, the laser beam at the write level is emitted by the optical pickup 10. Therefore, when the gradation level is high, the laser beam at the write level is emitted longer, and the reflectance of a larger region in the unit area on the image-recording layer of the optical disc D is changed. As a result, the user visually recognizes that the area is an area having a high density. In this embodiment, the length of the region in the unit area (the unit length) whose reflectance is to be changed is varied, so that the gradation contained in the image information is expressed. The servo level (the first intensity) is such a power level that the image-recording layer of the optical disc D is substantially unchanged when irradiated by the laser at the power of this level. To a region whose reflectance need not be changed, the laser beam at this servo level should be emitted instead of the laser beam at the write level.

Figure 8A:
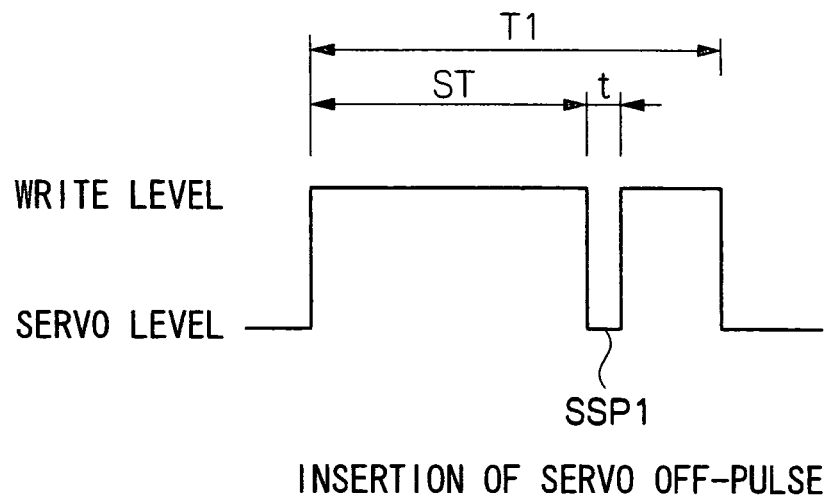
FIGS. 8A and 8B are diagrams for explaining the laser beam control method employed upon formation of a visible image on the image-recording layer of the optical disc by the optical disc recording apparatus.
Figure 8B:
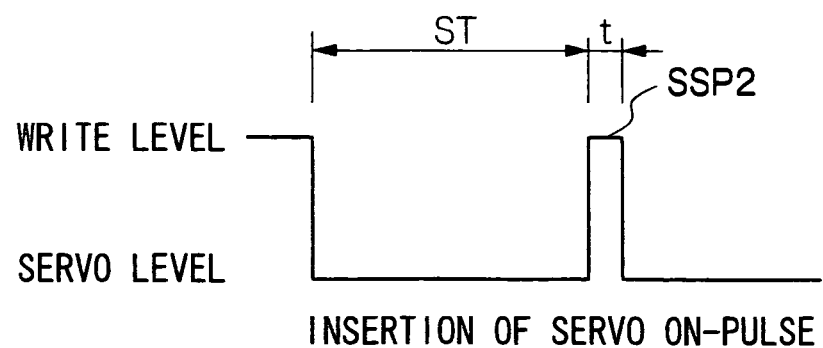

As described above, the drive pulse generator 35 generates a drive pulse that is consonant with information representing the gradation level for each coordinate point. In addition, the drive pulse generator 35 inserts a very short pulse at the write level or a pulse at the servo level regardless of the information representing the gradation level when required for the power control by the laser power control circuit 20 or the focusing and the tracking control by the servo circuit 13. For example, when, as is shown in FIG. 8A, a laser beam at the write level has to be emitted for a period T1 in order to express a visible image in accordance with the gradation level at specific coordinates contained in the image information and the period T1 is longer than a predetermined servo cycle ST for controlling the laser power, a servo off-pulse (SSP1) having a very short period t is inserted at the end of the servo cycle ST. When, as is shown in FIG. 8B, a laser beam at the servo level has to be emitted for a period equal to or longer than the servo cycle ST in order to express a visible image in accordance with the gradation level at specific coordinates contained in the image information, a servo on-pulse (SSP2) is inserted at the end of the servo cycle ST.

Figure 9:
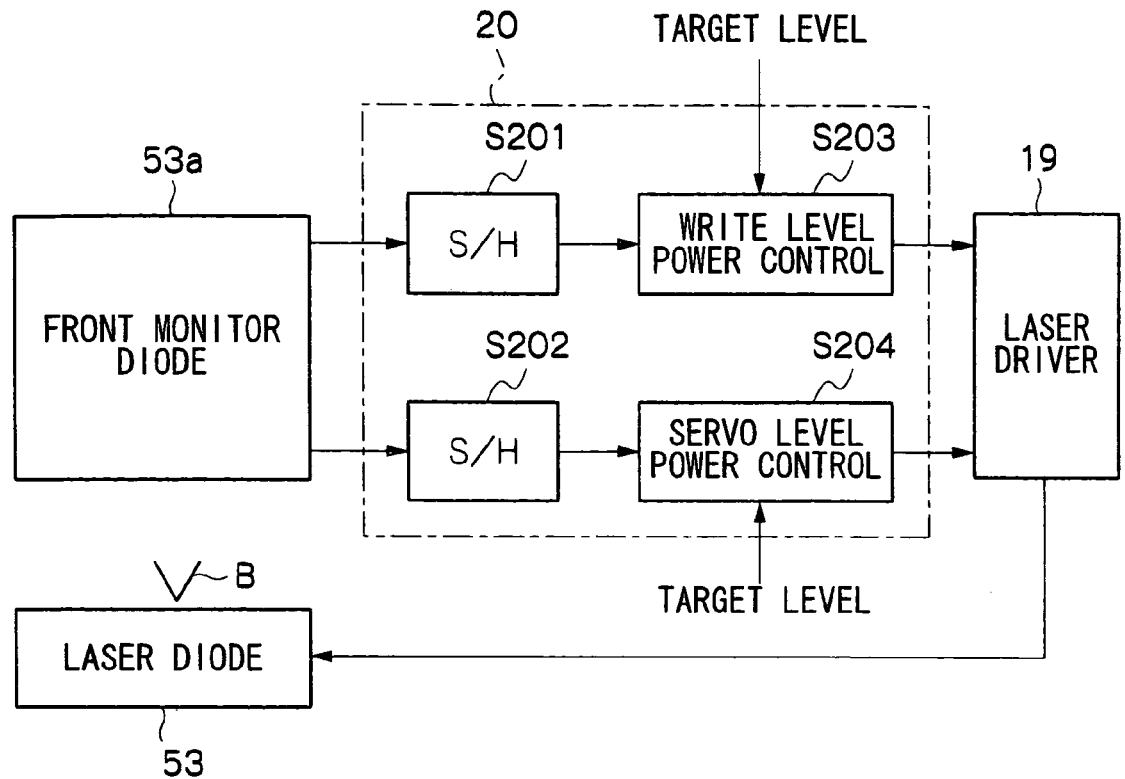
FIG. 9 is a diagram for explaining the laser power control performed by a laser power controlling circuit that is a component of the optical disc recording apparatus.

As is described above, the laser power control circuit 20 controls the laser power based on the current (which has a value corresponding to the intensity of the emitted laser beam) supplied by the front monitor diode 53a that receives the laser beam emitted by the laser diode 53 (see FIG. 5) of the optical pickup 10. More specifically, as is shown in FIG. 9, the laser power control circuit 20 performs sample holding of the value that corresponds to the intensity of the laser beam received by the front monitor diode 53a (S201 and S202). Then, when the laser beam is emitted at the write level as a target value, i.e., when a drive pulse at the write level (see FIGS. 7A and 7B and FIGS. 8A and 8B) is generated, the laser power control circuit 20 controls the laser power based on the sample holding results so as to emit the laser beam at the target write level transmitted by the control unit 16 (S203). Further, when a laser beam is emitted at the servo level as a target value, i.e. when the drive pulse at the servo level (see FIGS. 7A and 7B and FIGS. 8A and 8B) is generated, the laser power control circuit 20 controls the laser power based on the sample holding results so as to emit the laser beam at the target servo level transmitted by the control unit 16 (S204). Therefore, when the drive pulse at the write level or the servo level is not output continuously for a period longer than the predetermined servo cycle (sample cycle) ST, the servo off-pulse SSP1 or the servo on-pulse SSP2 is forcibly inserted regardless of the contents of the image information, and the laser power control can be conducted for each level in the above described manner.

Figure 10:
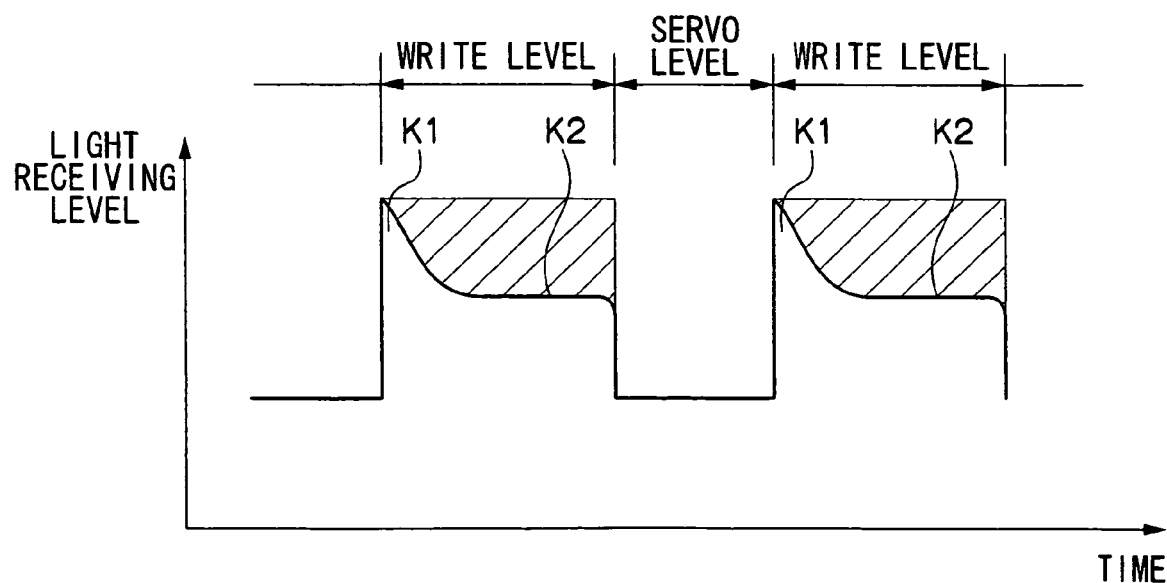
FIG. 10 is a diagram showing returning light of the laser beam originally emitted by the optical pickup of the optical disc recording apparatus to the image-recording layer of the optical disc.

The servo off-pulse SSP1 is inserted not only to control the laser power, but also for the focusing or the tracking control performed by the servo circuit 13. That is, the tracking control and the focusing control are performed based on the RF signal received by the light-receiving element 56 (see FIG. 5) of the optical pickup 10, i.e., the light (reflected light) of the laser beam that is emitted by the laser diode 53 and returned from the optical disc D. In FIG. 10 an example signal is shown which is received by the light-receiving element 56 upon irradiation with the laser beam. As is shown in FIG. 10, the reflected light at irradiation with the laser beam at the write level includes peak portion K1 at the rising time for the laser beam and subsequent shoulder portion K2 in which the laser level is constant, and the shaded area is regarded as the energy used for image formation. The energy used for image formation is not always a constant value, and may vary depending on the situation. Therefore, it is anticipated that the shape of the shaded area varies each time. That is, the reflected light of a laser beam at the write level carries a lot of noise and stable reflected light is not always obtained. When this reflected light is employed, it will interfere with accurate focusing and tracking control. Therefore, as described above, when a laser beam at the write level is continuously emitted for a long period of time, the reflected light of a laser beam at the servo level can not be obtained, and the focusing control and the tracking control can not be correctly performed.

This is why the servo off-pulse SSP1 is inserted so that the reflected light of a laser beam at the servo level can be obtained periodically and so that the focusing control and the tracking control are preformed based on the obtained reflected light. To form a visible image on the image-recording layer of the optical disc D, unlike the recording of information on the recordable side, tracing along the pregroove (guide groove) that is formed in advance on the optical disc D need not be performed. Therefore, in this embodiment, the target value for the tracking control is set as a fixed value (a predetermined offset value).

This control method can be employed not only for forming image information on the image-recording layer, but also for forming image information on the recordable side. That is, when a material whose reflectivity and color can be changed by irradiation with a laser beam is employed for the recordable side (information recording layer), an image can be formed on the recordable side as well as on the image-recording layer. However, when a visible image is formed on an area on the recordable side, the original data recording can not be performed on the area. Accordingly, it is preferable to separate the area for recording data from the area for forming a visible image in advance.

It is also preferable to minimize the period required for inserting the servo off-pulse SSP1 and the servo on-pulse SSP2 as long as various servo controls, such as the laser power control, the tracking control and the focusing control are not impaired. When the insertion period is very short, the various servo controls can be conducted while hardly affecting the visible image to be formed.

Figure 11:
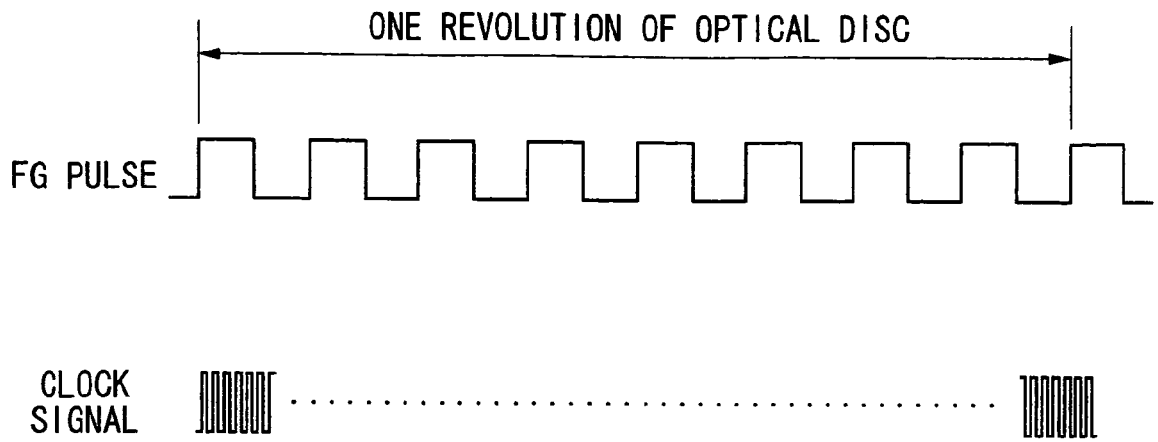
FIG. 11 is a diagram showing an FG pulse generated by a frequency generator 21 which is a component of the optical disc recording apparatus based on the revolutions of a spindle motor, and a clock signal generated based on the FG pulse.

Referring again to FIG. 4, the PLL circuit (signal output unit) 33 multiplies the FG pulse signal at a frequency supplied by the frequency generator 21 which is consonant with the revolution speed of the spindle motor 11, and outputs a clock signal to be used for forming a visible image, which will be described later. The frequency generator 21 employs a counter-electromotive current obtained by the motor driver of the spindle motor 11 and outputs the FG pulse at a frequency consonant with the number of spindle revolutions. For example, when, as is shown in the upper portion in FIG. 11, the frequency generator 21 generates eight FG pulses per one revolution of the spindle motor 11, i.e., per one revolution of the optical disc D, the PLL circuit 33 outputs a clock signal having a frequency equivalent to a multiple of the FG pulse (for example, a frequency equivalent to five times the FG pulse signals, or 40 pulses at level H during one revolution of the optical disc D), i.e., outputs a clock signal having a frequency that is consonant with the speed at which the optical disc D is rotated by the spindle motor 11, as is shown in the lower portion in FIG. 11. As a result, the clock signal obtained by multiplying the FG pulse signal is output by the PLL circuit 33 to the FIFO memory 34, and for each cycle of the clock signal, i.e., for each rotation of the disc D by a specific angle, data representing the gradation level at one coordinate point stored in the FIFO memory 34 is output to the drive pulse generator 35. The PLL circuit 33 may be employed to generate a clock signal obtained by multiplying the FG pulse. However, when a motor that has a satisfactorily stable driving capability is employed, instead of the PLL circuit 33, a crystal oscillator may be employed to generate the above described clock signal obtained by multiplying the FG pulse, i.e., a clock signal having a frequency that is consonant with the speed at which the optical disc D is revolve.

The stepping motor 30 is a motor for moving the optical pickup 10 in the direction of the radius of the optical disc D that is loaded. The motor driver 31 rotates the stepping motor 30 to a degree consonant with the pulse signal supplied by the motor controller 32. In accordance with a moving start instruction which is issued by the control unit 16 and which includes the information about the direction and the distance of the movement of the optical pickup 10 along the radius, the motor controller 32 generates a corresponding pulse signal and outputs it to the motor driver 31. When the stepping motor 30 moves the optical pickup 10 in the direction of the radius of the optical disc D and the spindle motor 11 rotates the optical disc D, the laser irradiation position of the optical pickup can be moved to various locations on the optical disc D, and the above described components constitute irradiation position adjustment unit.

The control unit 16 is constituted by a CPU (Central Processing Unit), a ROM (Read Only Memory) and a RAM (Random Access Memory), and controls the individual sections of the optical disc recording apparatus 100 in accordance with a program stored in the ROM, so that the recording process on the recordable side of the optical disc D and the image forming process on the image-recording layer of the optical disc D are concentrically controlled.

The configuration of the optical disc recording apparatus 100 of this embodiment is as described above.

B Operation of Optical Disc Recording Apparatus

Figure 12:
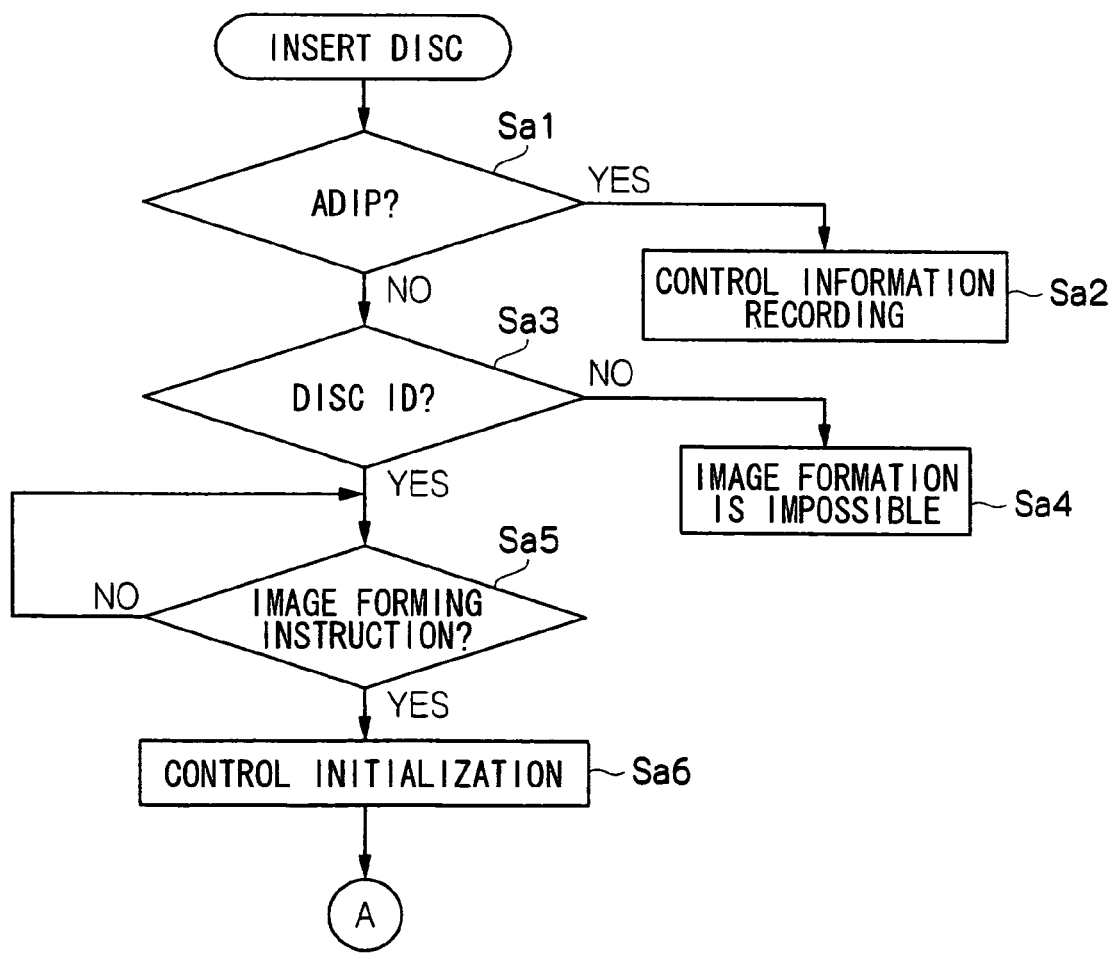
FIG. 12 is a flowchart for explaining the operation of the optical disc recording apparatus.

The operation of the thus arranged optical disc recording apparatus 100 will now be described. As is described above, the optical disc recording apparatus 100 can record, on the recordable side of the optical disc D, information such as music data received from the host PC 110, and can also form, on the image-recording layer of the optical disc D, a visible image that corresponds to the image information supplied by the host PC 110. While referring to FIGS. 12 and 13, an explanation will now be given about the operation of the optical disc recording apparatus 100 that can perform data recording and visible image formation.

When the optical disc D is loaded into the optical disc recording apparatus 100, first, the control unit 16 controls the optical pickup 10 and the like so as to determine what format the side of the optical disc D facing the optical pickup 10 has. For example, in the case of a DVD-R, the presence or absence of land pre-pit signals and pre-record signals is detected, and in the case of a DVD+R, the presence or absence of ADIP (Address in Pregroove) is detected (Step Sa1). When such information is not recorded, the disc is not recognized as an optical disc.

For example, when land pre-pit signals or pre-record signals are detected on a DVD-R as the loaded optical disc D, or when ADIP is detected on a DVD+R as the loaded optical disc D, it is confirmed that the optical disc D is set such that the recordable side faces the optical pickup 10, and the control unit 16 conduct a control process of recording the date supplied from the host PC 110 on the recordable side (Step Sa2). Since the control process of recording the data is similar to that employed in a conventional optical recording apparatus (such as a DVD-R or DVD+R drive apparatus), description thereof is omitted.

Figure 14:
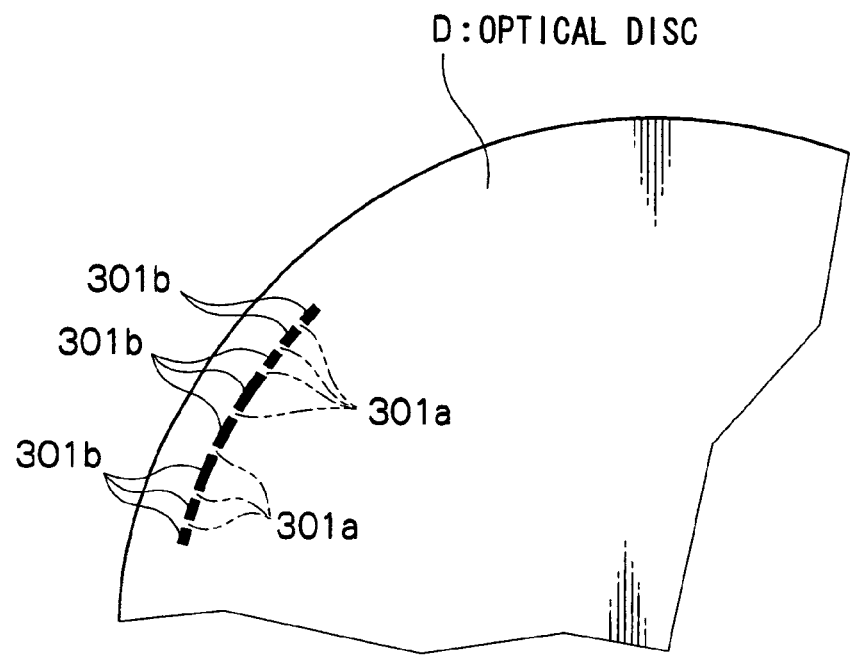
FIG. 14 is a diagram showing a disc ID recorded on the image-recording layer side of the optical disc.

On the other hand, when pre-pit signals representing an optical disc capable of forming an image are detected from the loaded optical disc D, it is confirmed that the optical disc D is set such that the image-recording layer faces the optical pickup 10, and the control unit 16 determines whether it is possible to retrieve the disc ID of the loaded optical disc D (Step Sa3). The disc ID of the optical disc D can be included in the pre-pit signals. Further, for example as shown in FIG. 14, a visible image corresponding to the information obtained by coding the disc ID may be recorded along the outermost circumference or the innermost circumference (including the intermediate position between the logo region and the image forming region) of the optical disc D on the image-recording layer side. In FIG. 14, as is shown, the disc ID is recorded on the image recording layer of the optical disc D by forming reflective areas 301a and non-reflective areas 301b having lengths respectively corresponding to the codes along the outermost circumference. The control unit 16 traces the laser irradiation position of the optical pickup 10 along the outermost circumference of the optical disc D, and obtains the disc ID based on the reflected light.

Therefore, when the reflective regions 301a and the non-reflective regions 301b that correspond to the disc ID are not formed in the outermost-portion of the image-recording layer, it can be ascertained that the optical disc D is an ordinary optical disc, such as a CD-R or DVD-R, that does not have a image-recording layer. When, as in this case, a disc ID can not be obtained, the control unit 16 ascertains that the optical disc D is incapable of visible image formation (step Sa4), and notifies a user of this determination.

When the disc ID can be obtained from the optical disc D, the control unit 16 waits until an image forming instruction including the image information is issued by the host PC 110 (step Sa5). When the image forming instruction is issued, the control unit 16 performs an initialization process in order to form a visible image on the image-recording layer of the optical disc D (step Sa6). More specifically, the control unit 16 permits the servo circuit 13 to rotate the spindle motor 11 at a predetermined angular speed, or sends to the motor controller 32 an instruction for moving the optical pickup 10 to the initial innermost position along the radius of the optical disc D, and permits the motor controller 32 to drive the stepping motor 30.

Furthermore, in the initialization process for image formation, the control unit 16 gives instruction about the target focus control value to the servo circuit 13, so that the image-recording layer of the optical disc D is irradiated with a laser beam whose beam spot diameter is larger than the beam spot diameter employed in the information recording on the recordable side.

Figure 15:
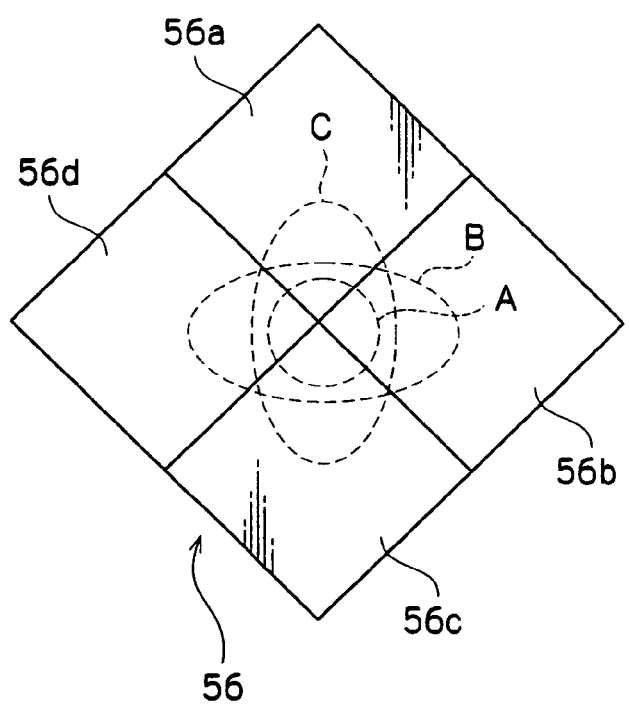
FIG. 15 is a diagram showing shapes of the returning laser beams that are received by the light-receiving element of the optical pickup of the optical disc recording apparatus.

A more specific explanation will now be given about the focusing control process performed when the above described target value is designated. As is described above, the servo circuit 13 performs the focusing control based on the signal output by the light-receiving element 56 of the optical pickup 10. In the process of recording data on the recordable side of the optical disc D, the servo circuit 13 drives the focus actuator 64 (see FIG. 5) such that circular return light A in FIG. 15 is received at the center of four areas 56a, 56b, 56c and 56d of the light-receiving element 56 in FIG. 15. That is, when the amounts of light received in the areas 56a, 56b, 56c and 56d are defined as a, b, c and d, the focus actuator 64 is driven so that (a+c)−(b+d)=0 is established.

For forming a visible image on the image-recording layer of the optical disc D, the focusing control is performed such that the image-recording layer is irradiated by the laser beam having a larger diameter than the laser diameter employed during the information recording on the recordable side. When the shape of the return light received by the light-receiving element 56 in FIG. 15 is an ellipse (B or C in FIG. 15), the servo circuit 13 drives the focus actuator 64 such that this elliptical return light can be received by the light-receiving element 56 because the spot of the laser beam B or C is larger than the circular laser beam A. In other words, the focus actuator 64 is driven to satisfy (a+c)−(b+d)=α (α is not 0). Therefore, in this embodiment, the control unit 16 and the servo circuit 13 constitute beam spot control unit.

Figure 16A:
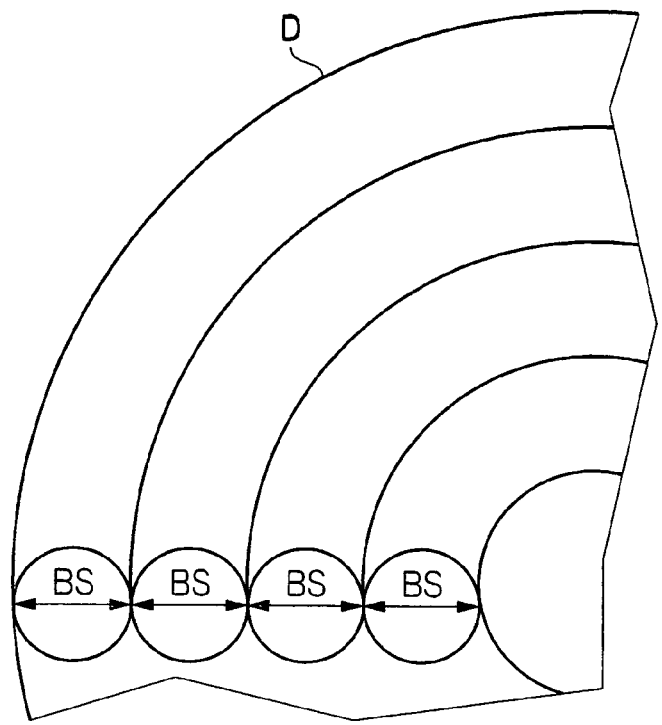
FIGS. 16A and 16B are diagrams for explaining the size of the beam spot of a laser beam that the optical pickup of the optical disc recording apparatus emits to the image-recording layer of the optical disc.
Figure 16B:
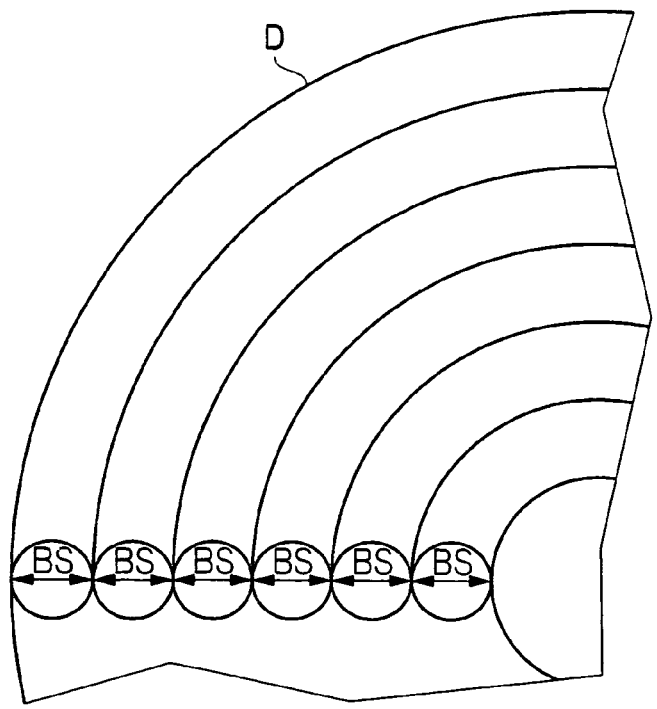

As is described above, when the control unit 16 permits the servo circuit 13 to set α (not 0) in the initialization process for forming the visible image, the image-recording layer of the optical disc D can be irradiated with the laser beam having a larger spot diameter than that employed in the information recording on the recordable side. Since the image-recording layer of the optical disc D is irradiated with the laser beam of a larger spot diameter than that employed in the information recording on the recordable side, the following effects can be obtained. That is, in the embodiment, the laser beam is emitted for forming a visible image while the optical disc D is rotated, similarly to the information recording on the recordable side. Therefore, when the diameter of the beam spot of the laser beam is increased, a visible image can be formed on the entire image-recording layer of the optical disc D within a shorter period of time. The reason for this will now be described while referring to FIGS. 16A and 16B. In a comparison between the case where the beam spot diameter BS is large and the case where the beam spot diameter BS is small, the area subjected to visible image formation upon one revolution of the optical disc D is larger when the beam spot diameter BS is larger, as specifically shown in FIGS. 16A and 16B. Therefore, when the beam spot diameter BS is small, the optical disc D must be rotated more to form a visible image on the entire area (in the example in FIGS. 16A and 16B, six revolutions are required when the beam spot diameter BS is small while four revolutions are required when the beam spot diameter BS is large, and), so that an extended period of time is required for image formation. For this reason, in the process for forming a visible image, the optical disc recording apparatus 100 in this embodiment emits the laser beam having a larger spot diameter than that employed for information recording.

In the initialization process for image formation, the control unit 16 sends instructions about the target values for the write level and the servo level to the laser power control circuit 20 such that the optical pickup 10 emits the laser beam at the write level and the servo level corresponding to the obtained disc ID. That is, the target values for the write level and the servo level are stored in the ROM of the control unit 16 for each of a plurality of disc ID types. The control unit 16 reads the target values for the write level and the servo level that correspond to the obtained disc ID, and sends instructions about these target values to the laser power control circuit 20.

Based on the following reasons, the target power values are set in accordance with the disc ID. The characteristic of the dye used in the image-recording layer may differ depending on the type of the optical disc D, and when the characteristic differs, the characteristic for the level of laser beam power required for changing the reflectance of the image-recording layer differs accordingly. Therefore, even if satisfactory change in the reflectance of the image-recording layer of a certain optical disc D is achieved by a laser beam at a certain write level, it does not necessarily mean that the laser beam at the write level can change the reflectance of the image-recording layer of another optical disc D. Therefore, in this embodiment, the target values for the write level and the servo level are obtained for optical discs that correspond to various disc IDs in advance through experiments. Then, the obtained target values in relationship to the individual disc IDs are stored in the ROM so that optical power control can be conducted in accordance with the characteristics of the image-recording layer of various optical discs D.

Figure 13:
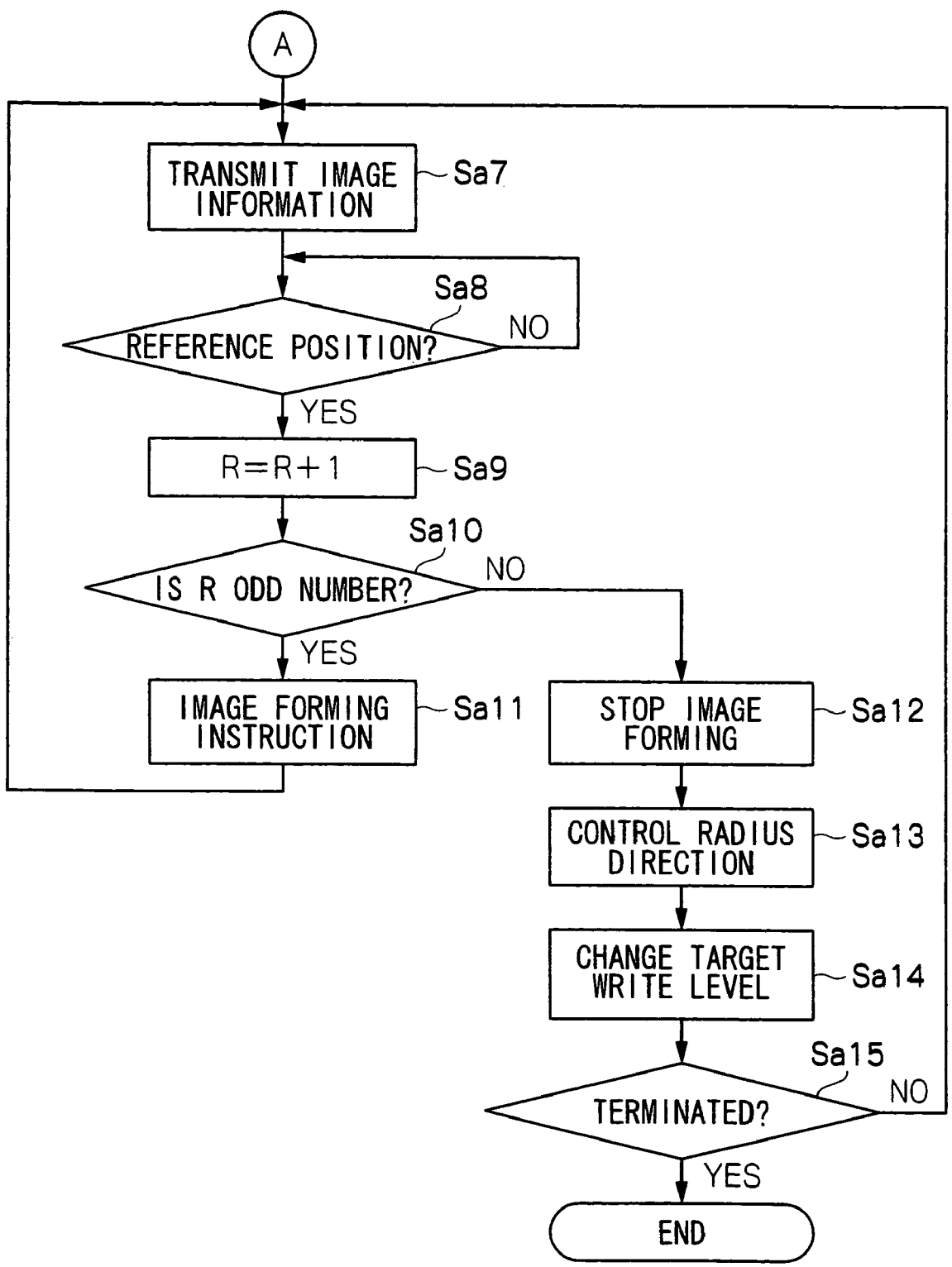
FIG. 13 is a flowchart for explaining the operation of the optical disc recording apparatus.

When the control unit 16 performs the above described initialization, the process for forming a visible image on the image-recording layer of the optical disc D is actually started. As is shown in FIG. 13, first, the control unit 16 transmits to the FIFO memory 34 image information received from the host PC 110 via the buffer memory 36 (step Sa7). Then, the control unit 16 employs an FG pulse signal received from the frequency generator 21 to determine whether a predetermined reference position on the optical disc D that is rotated by the spindle motor 11 has passed through the laser irradiation position of the optical pickup 10 (step Sa8).

Figure 17:
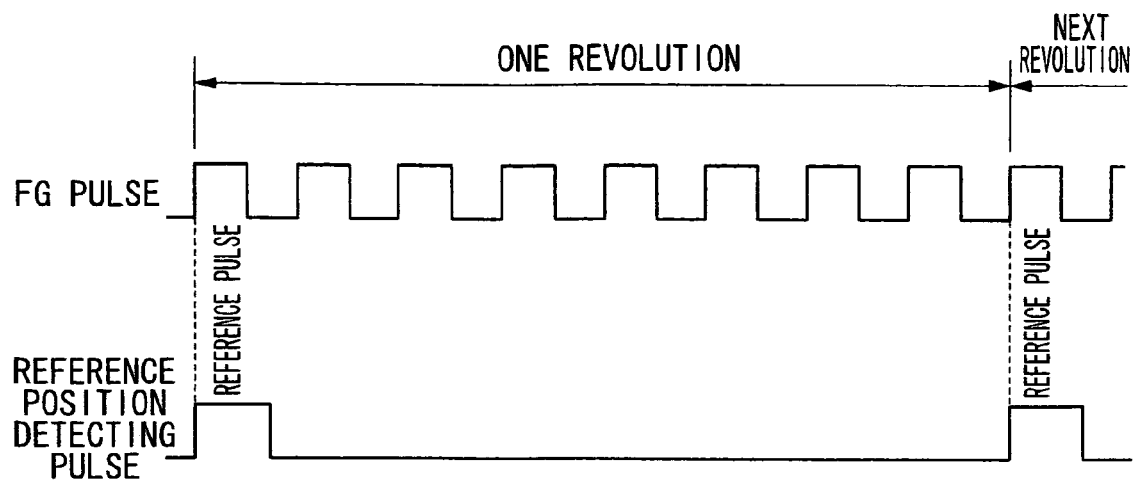
FIG. 17 is a diagram for explaining a method for detecting that the laser irradiation position of the optical disc recording apparatus has passed the reference position on the optical disc.
Figure 18:
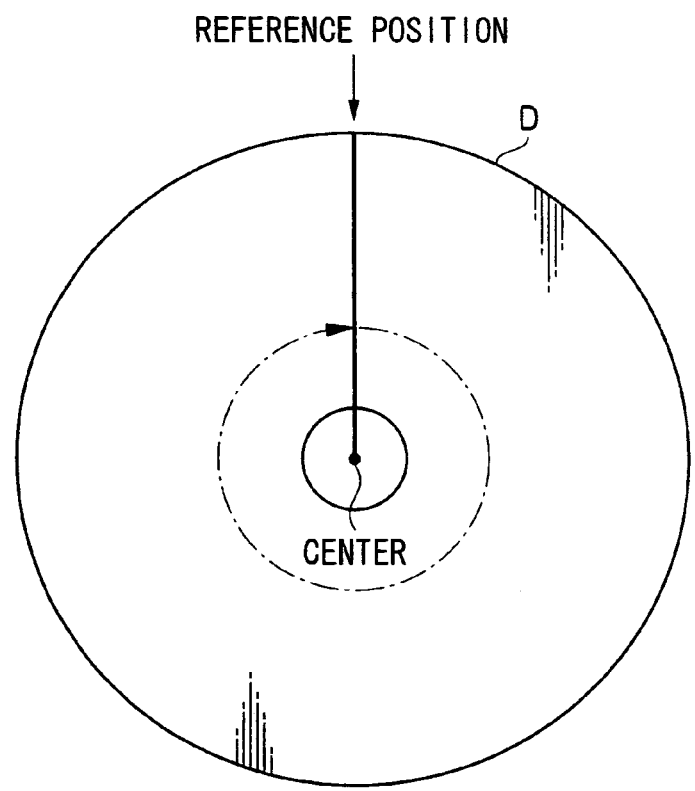
FIG. 18 is a diagram for explaining a method for detecting that the laser irradiation position of the optical disc recording apparatus has passed the reference position on the optical disc.

While referring to FIGS. 17 and 18, an explanation will now be given about a method for detecting the predetermined reference position, and for determining whether the laser irradiation position has passed the reference position. As is shown in FIG. 17, the frequency generator 21 outputs a predetermined number of FG pulses (eight FG pulses in this example) during one revolution of the spindle motor 11, i.e., during one revolution of the optical disc D. Therefore, the control unit 16 outputs one of the FG pulses received from the frequency generator 21 as a reference position detection pulse in synchronization with the rising time of a reference pulse. The control unit 16 thereafter generates a reference position detection pulse signal in synchronization with the rising timing of the pulse which is generated one revolution after the last reference position detection pulse (eight pulses after the pulse functioning as the last reference position detection pulse in this example). Since the reference position detection pulse is generated, this pulse generation timing can be identified as the timing at which the laser irradiation position of the optical pickup 10 passes the reference position of the optical disc D. Specifically, as is shown in FIG. 18, if the laser irradiation position of the optical pickup 10 at the generation of the first reference position detection pulse is a position on the thick line (since the optical pickup 10 can be moved in the radius direction, possible irradiation position is represented by a line). When the reference position detection pulse is generated after one revolution, the laser irradiation position of the optical pickup 10 is also on the thick line. As is described above, the radial line on which the laser irradiation position is located at the time of the generation of the first reference position detection pulse is defined as a reference position, and the control unit 16 can detect when the laser irradiation position passes the reference position on the optical disc D based on the reference position detection pulse signal generated each time the optical disc D makes one revolution. The chained line in FIG. 18 describes an example of trajectory of the laser irradiation position from the time one reference position detection pulse is generated to the time the next reference position detection pulse is generated.

When the control unit 16 detects that the laser irradiation position passes the reference position of the optical disc D by the above method after receiving the image forming instruction from the host PC 110, the control unit 16 increases a variable R representing the number of revolutions by one (step Sa9), and then determines whether the variable R is an odd number (step Sa10).

Figure 19:
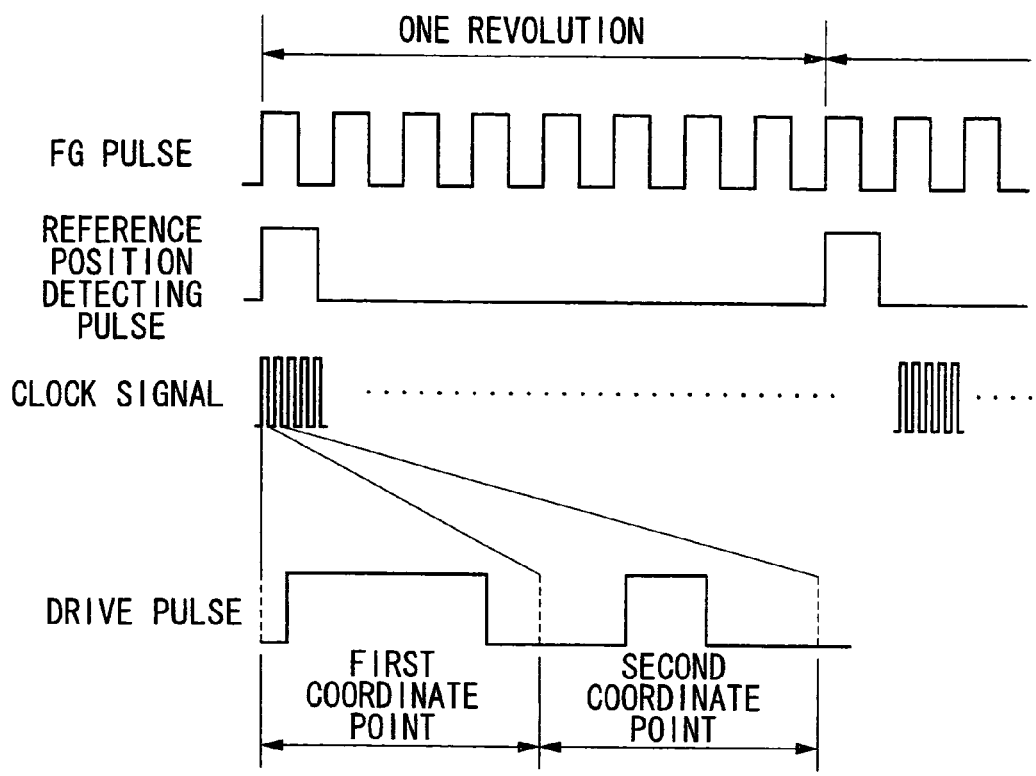
FIG. 19 is a timing chart for explaining the operation of the optical disc recording apparatus upon irradiation of the image-recording layer of the optical disc with a laser beam to form a visible image.

In this case, when the controller detects that the laser irradiation position passes the reference position for the first time after receiving the image forming instruction, the following calculation is conducted: R=0 (initial value)+1=1. Then, at step Sa10 it is found that the variable R is an odd number. When it is found that the variable R is an odd number, the control unit 16 permits the optical pickup 10 to irradiate the image-recording layer of the optical disc D with the laser beam so as to form a visible image (step Sa11). More specifically, after the reference position detection pulse is received, the control unit 16 controls the respective sections such that image information stored in the FIFO memory 34 are sequentially output in synchronization with a clock signal output by the PLL circuit 33. Under the control of the control unit 16, information stored in the FIFO memory 34 indicating the gradation level for one coordinate point is output to the drive pulse generator 35 upon receiving each clock pulse from the PLL circuit 33, as is shown in FIG. 19. The drive pulse generator 35 generates a drive pulse having a corresponding pulse width in accordance with the gradation level indicated by the information, and outputs it to the laser driver 19. As a result, the optical pickup 10 emits the laser beam at the write level to irradiate the image-recording layer of the optical disc D only for a period corresponding to the gradation level of each coordinate point. Since the reflectance of the irradiated area is changed, a visible image as shown in FIG. 20 can be formed.

Figure 20:
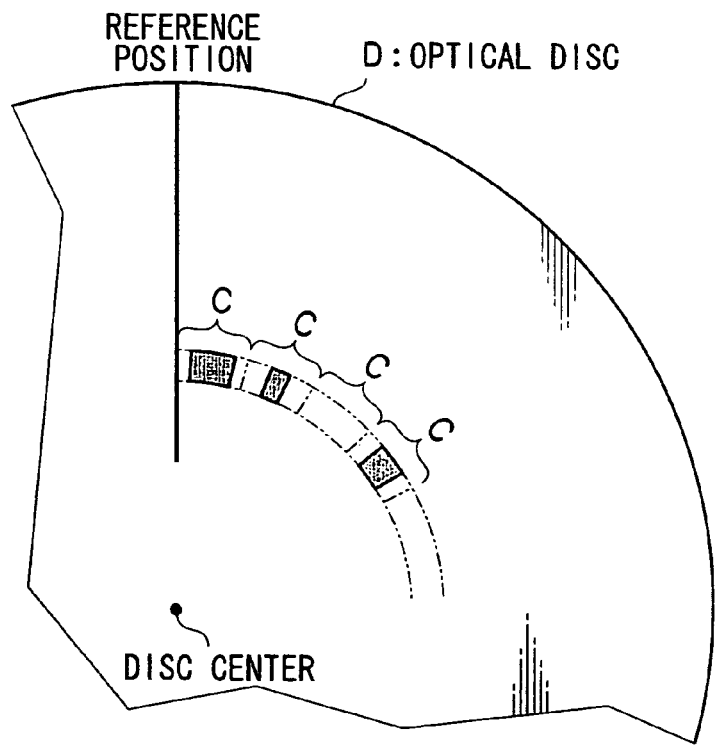
FIG. 20 is a diagram showing the image-recording layer of the optical disc at irradiation with a laser beam emitted by the optical disc recording apparatus.
Figure 21A:
FIGS. 21A, 21B, 21C and 21D are top views showing examples of the optical discs of the invention.
Figure 21B:
Figure 21C:
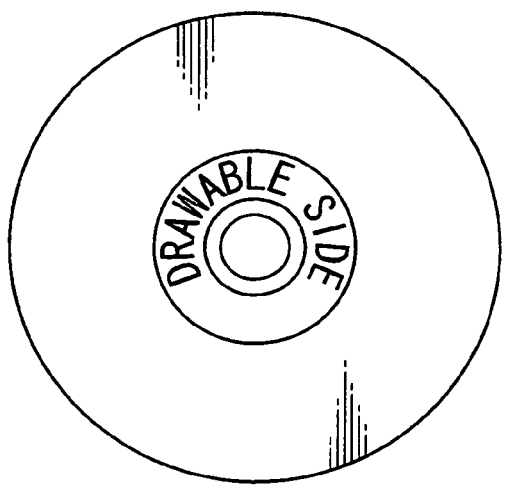
Figure 21D:
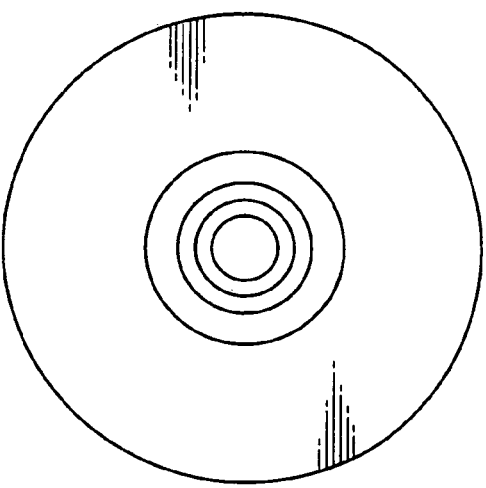

As is schematically shown in the Fig, the laser irradiation position of the optical pickup 10 is moved along a circle a distance corresponding to the regions indicated by C in FIG. 20 during one clock signal cycle (a period from the leading edge of one pulse to the leading edge of the next pulse) since the optical disc D is rotated by the spindle motor 11. While the laser irradiation position is passing the regions C, the period for the irradiation with the laser beam at the write level is changed in accordance with the gradation level, so that the areas whose reflectance is changed can be different between the respective regions C in accordance with different gradation levels. Since the period for the irradiation with the laser beam at the write level at passing each region C is adjusted in accordance with the gradation level of each coordinate point, a visible image consonant with the image information can be formed on the image-recording layer of the optical disc D.

When the control unit 16 has performed the above irradiation process for forming a visible image by using the laser beam that is controlled in accordance with the image information, the process in the control unit 16 is returned to step Sa7 and image information supplied from the buffer memory 36 are transmitted to the FIFO memory 34. Then, the control unit 16 determines whether the laser irradiation position of the optical disc D has passed the reference position on the optical disc D. When the control unit 16 confirms that the laser irradiation position has passed the reference position, it increases the variable R by one. When the resultant variable R is an even number, the control unit 16 controls the individual sections so as to stop the visible image formation by the irradiation of the optical disc D with laser beam (step Sa12). More specifically, the control unit 16 prevents the transfer of the information indicating the gradation level of each coordinate point from the FIFO memory 34 to the drive pulse generator 35 in synchronization with a clock signal received from the PLL circuit 33. That is, in the next revolution of the optical disc D after the visible image is formed with the laser beam at the write level, the control unit 16 halts the irradiation with the laser beam for changing the reflectance of the image-recording layer.

When the control unit 16 has halted the laser beam irradiation for visible image formation, the control unit 16 instructs the motor controller 32 to move the optical pickup 10 a predetermined distance toward the outer edge in the direction of the radius (step Sa13). Upon receiving this instruction, the motor controller 32 drives the stepping motor 30 via the motor driver 31, and the optical pickup 10 is moved the predetermined distance toward the outer edge.

As is described above, the predetermined distance the optical pickup 10 is moved in the direction of the radius on the optical disc D can be appropriately determined in accordance with the beam spot diameter BS (see FIGS. 16A and 16B) of the laser beam emitted by the optical pickup 10. That is, to form a high-quality visible image on the image-recording layer of the optical disc D, it is necessary for the laser irradiation position of the optical pickup 10 to be moved such that the laser irradiation position can cover any area on the surface of the optical disc D. Therefore, when the length of the travel distance unit of the optical pickup 10 in the direction of the radius is defined as substantially the same as the beam spot diameter BS of the laser beam employed to irradiate the optical disc D, the laser beam can be emitted to any area on the surface of the optical disc D, and an image having a higher quality can be formed. Due to various factors such as the property of the image-recording layer, a region larger than the beam spot diameter of the emitted laser may be colored. In this case, the travel distance unit should be determined so as to prevent overlap between adjacent colored regions, taking into account the width of the colored regions. In this embodiment, since the beam spot diameter BS is larger (e.g., about 20 μm) than the beam spot diameter employed for recording information on the recordable side, the control unit 16 permits the motor controller 32 to drive the stepping motor 30 so as to move the optical pickup 10 in the direction of the radius a distance substantially equivalent to the beam spot diameter BS. It should be noted that a recent stepping motor 30 employs the μ step technique to adjust the travel distance at a 10 μm level. Thus, it is naturally possible to move the optical pickup 10 at a 20 μm order in the direction of the radius using the stepping motor 30.

After the optical pickup 10 is moved a predetermined distance in the direction of the radius, in order to change the target write level of the laser value, the control unit 16 instructs the laser power control circuit 20 to use the updated write level for the emission of the laser beam (step Sa14). In this embodiment, the method used to form a visible image is the CAV method in which the laser beam is emitted while the optical disc D is rotated at a constant angular speed. When the optical pickup 10 is moved toward the outer edge in the above described manner, the linear velocity is increased. Therefore, when the optical pickup 10 is moved in the direction of the radius (toward the outer edge), the target write level value is increased to such a laser power that the reflectance of the image-recording layer of the optical disc D can be sufficiently changed even when linear velocity is changed.

After the optical pickup 10 is moved in the direction of the radius and the target write level is changed, the control unit 16 determines whether there are any unprocessed image information for visible image formation, i.e., whether there are image information that have not been transmitted to the drive pulse generator 35 yet. When no such image information is present, the processing is terminated (step Sa15).

When there is unprocessed image information that have not been transmitted to the motor controller 32 yet, program control returns to step Sa7, and the process for forming a visible image is repeated. Specifically, the control unit 16 transmits image information to the FIFO memory 34 (step Sa7) and determines whether the laser irradiation position has passed the reference position on the optical disc D (step Sa8). When the laser irradiation position has passed the reference position, the control unit 16 increases, by one, the variable R indicating the number of revolutions (step Sa9), and determines whether the updated variable R is an odd number (step Sa10). When the variable R is an odd number, the control unit 16 controls the individual sections to emit the laser beam to form a visible image. And when the variable R is an even number, the control unit 16 halts the laser emission for the formation of a visible image (while emitting the laser beam at the servo level), and performs the control processes, such as movement of the optical pickup 10 in the direction of the radius and the updating of the target write level value. That is, when the laser beam (including the laser beam at a write level) for image formation is emitted and used to irradiate the optical disc D during a certain revolution, the control unit 16 halts the laser irradiation used for image forming during the next revolution, and instead, moves the optical pickup 10 in the direction of the radius. Since the moving of the optical pickup 10 and the changing of the target write level are performed during the revolution in which the image formation is not performed, image forming is halted while the irradiation position and the power value of the laser beam are changed, and the laser irradiation for image formation can be started after the irradiation position and the intensity of the laser beam are settled. Therefore, deterioration of the quality of the visible image due to the travel of the optical pickup 10 in the direction of the radius can be prevented.

The primary operation of the optical disc recording apparatus 100 of this embodiment has been explained. According to the optical disc recording apparatus 100, the laser beam is emitted and used for irradiating the image-recording layer provided on the optical disc D to form a visible image in accordance with the image information without using additional printing unit while the individual sections of the optical pickup 10 for recording information on the recordable side are utilized as far as possible.

Furthermore, in this embodiment, the laser irradiation timing is controlled based on the clock signal generated using an FG pulse produced in accordance with the rotation of the spindle motor 11, i.e., the clock signal generated in accordance with the number of revolutions of the optical disc D. Therefore, the optical disc recording apparatus 100 can obtain the laser irradiation position without requiring positional information of the optical disc D. Thus, the optical disc recording apparatus 100 does not require a specially manufactured optical disc D having a pregroove (a guide groove) provided on the image-recording layer, and a visible image consonant with image information can be formed on the image-recording layer not having a preformed pregroove or positional information.

Next, the recording of information (digital information) on the information-recording layer is described. When an optical disc whose information-recording layer is of dye-type is used, the unrecorded optical disc is irradiated with laser light from the laser pickup while being rotated at a predetermined linear recording velocity. The dye in the information-recording layer absorbs the laser light to locally increase its temperature, whereby the desired pits are formed to change the optical characteristics in the pit region, thereby recording information.

The waveform of the recording laser light for one pit may be a pulse string or a single pulse. The proportion of the pulse(s) to the length (pit length) on which information is to be actually recorded is important.

The pulse width of the laser light is preferably 20 to 95% of the length on which information is to be actually recorded, more preferably 30 to 90%, still more preferably 35 to 85%. When the recording waveform is a pulse string, the total sum of the pulse widths is preferably in the above range.

The power of the laser light depends on the linear recording velocity. When the linear recording velocity is 3.5 m/s, the power of the laser light is preferably 1 to 100 mW, more preferably 3 to 50 mW, still more preferably 5 to 20 mW When the linear recording velocity is doubled, the above suitable ranges of the power of the laser light are respectively increased $2^{1/2}$-fold.

The NA of the objective lens used for the pickup is preferably 0.55 or higher, more preferably 0.60 or higher, so as to improve the recording density.

In the invention, a semiconductor laser having an oscillation wavelength of 350 to 850 nm may be used as a recording light source.

When the information-recording layer is a phase change information-recording layer, the information-recording layer comprises a substance such as described above, and the phase transition between the crystal phase and the amorphous phase can be repeated by irradiation with laser light.

Upon recording of information, the phase change recording layer is irradiated with a focused laser light pulse for a short time to melt the phase change recording layer partially. The melted portion is rapidly cooled by heat diffusion to solidify, thereby forming a recording mark in the amorphous state. Upon erasing the information, the recording mark portion is irradiated with laser light to be heated to a temperature which is in the range of from the crystallization temperature of the information-recording layer to the melting point of the information-recording layer inclusive, and then slowly cooled to crystallize the recording mark in the amorphous state, thereby returning the recording mark portion to the initial unrecorded state.

According to the optical disc of the invention, a side on which image formation can be carried out is readily distinguished from a side on which image formation is not to be carried out, and quality control can be facilitated. Furthermore, the image forming method of the invention is suitable for image forming on such an optical disc.

Hereinafter, exemplary embodiments of the invention will be described. However, the invention is not limited to these exemplary embodiments.

Namely, according to an aspect of the invention, there is provided an optical disc on which a visible image can be formed by irradiation of laser light, which comprises a logo area on which visible information is indicated, a pre-pit signal area, and an image forming area on which a visible image can be formed by irradiation of laser light.

In the optical disc of an aspect of the invention, it is preferable that the image forming area is positioned at a deeper level than the logo area. It is preferable that the pre-pit signal area is positioned at a deeper level than the logo area. It is preferable that an outer circumference of the logo area is positioned closer to an outer circumference of the optical disc than an inner circumference of the pre-pit signal area. It is preferable that an image-recording layer of the image forming area is formed between two substrates facing each other. It is preferable that the two substrates each have a thickness of 0.3 mm to 0.9 mm. Furthermore, it is preferable that an indented portion is formed on the substrate on which the image-recording layer is formed, at the side having the image-recording layer, and the indented portion forms a logo area. The logo area preferably comprises two or more layers.

According to another aspect of the invention, there is provided an image forming method of forming a visible image by irradiation of laser light on an optical disc, the method comprising detecting a pre-pit signal from a pre-pit signal area formed on the optical disc, and forming the visible image based on the result of the detection, wherein the optical disc is the optical disc according to an aspect of the invention. It is preferable that, in the forming of the visible image, the laser wavelength is 630 to 680 nm and the numerical aperture is 0.6 to 0.7.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The disclosure of Japanese patent Application No. 2005-2888847 is incorporated herein by reference in its entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. An optical disc on which a visible image can be formed by irradiation of laser light, the optical disc comprising:
    a logo area, on which visible information is indicated;
    a pre-pit signal area; and
    an image forming area, on which a visible image can be formed by irradiation of laser light, wherein:
    logo area, the pre-pit signal area and the image forming area are provided in this order from an inner circumference of the optical disc;
    an outer circumference of the logo area is positioned closer to an outer circumference of the optical disc than an inner circumference of the pre-pit signal area;
    the pre-pit signal area generates a pre-pit signal including information for image forming;
    the image forming area is positioned at a deeper level than the logo area; and
    the pre-pit signal area is positioned at a deeper level than the logo area.

2. The optical disc of claim 1, wherein an image-recording layer of the image forming area is formed between two substrates facing each other.

3. The optical disc of claim 2, wherein the two substrates each have a thickness of 0.3 mm to 0.9 mm.

4. The optical disc of claim 2, wherein an indented portion is formed on the substrate on which the image-recording layer is formed, at the side having the image-recording layer, and the indented portion forms the logo area.

5. The optical disc of claim 1, wherein the logo area comprises two or more layers.

6. An image forming method of forming a visible image by irradiation of laser light on an optical disc, the method comprising: detecting a pre-pit signal from a pre-pit signal area formed on the optical disc; and forming the visible image based on the result of the detection; wherein the optical disc is the optical disc of claim 1.

7. The image forming method of claim 6, wherein in the forming of the visible image, the laser wavelength is 630 nm to 680 nm and the numerical aperture is 0.6 to 0.7.

8. The optical disc of claim 1, wherein the image forming area is positioned at a deeper level than the pre-pit signal area.

9. The optical disc of claim 1, wherein the logo area is positioned below a surface of the disc on a non-recordable side of the disc.

* * * * *